United States Patent
Honma et al.

(10) Patent No.: US 10,793,666 B2
(45) Date of Patent: Oct. 6, 2020

(54) POLYISOCYANATE COMPOSITION, POLYURETHANE RESIN AND TWO-COMPONENT CURABLE POLYURETHANE COMPOSITION

(71) Applicant: MITSUI CHEMICALS, INC., Tokyo (JP)

(72) Inventors: Shirou Honma, Yokohama (JP); Kazuyuki Fukuda, Ichihara (JP); Hideaki Otsuka, Chiba (JP); Tsutomu Yoshida, Chigasaki (JP); Toshiaki Moriya, Sagamihara (JP); Tatsuya Nakashima, Takarazuka (JP)

(73) Assignee: MITSUI CHEMICALS, INC., Tokyo (JP)

( * ) Notice: Subject to any disclaimer, the term of this patent is extended or adjusted under 35 U.S.C. 154(b) by 210 days.

(21) Appl. No.: 15/735,025

(22) PCT Filed: Jun. 8, 2016

(86) PCT No.: PCT/JP2016/066995
§ 371 (c)(1),
(2) Date: Dec. 8, 2017

(87) PCT Pub. No.: WO2016/199793
PCT Pub. Date: Dec. 15, 2016

(65) Prior Publication Data
US 2018/0155486 A1    Jun. 7, 2018

(30) Foreign Application Priority Data

Jun. 12, 2015 (JP) ................. 2015-119356

(51) Int. Cl.
*C08G 18/79* (2006.01)
*C08G 18/80* (2006.01)
(Continued)

(52) U.S. Cl.
CPC ......... *C08G 18/794* (2013.01); *C08G 18/022* (2013.01); *C08G 18/092* (2013.01);
(Continued)

(58) Field of Classification Search
CPC ...... C08G 18/794; C08G 18/68; C08G 18/73; C08G 18/722; C08G 18/725; C08G 18/7831
See application file for complete search history.

(56) References Cited

U.S. PATENT DOCUMENTS 3,920,644 A    11/1975    Handa et al.
4,864,025 A    9/1989    Robin et al.
(Continued)

FOREIGN PATENT DOCUMENTS

CN    1473861 A    2/2004
CN    1582309 A    2/2005
(Continued)

OTHER PUBLICATIONS

JP_2010024386, Feb. 2010, English Translation.*
(Continued)

*Primary Examiner* — Michael L Leonard
(74) *Attorney, Agent, or Firm* — Rankin, Hill & Clark LLP

(57) ABSTRACT

A polyisocyanate composition includes an isocyanurate derivative of xylylene diisocyanate, and a biuret derivative of aliphatic polyisocyanate.

5 Claims, 3 Drawing Sheets

(51) Int. Cl.

| | | |
|---|---|---|
| C08G 18/72 | (2006.01) | |
| C08G 18/09 | (2006.01) | |
| C08G 18/16 | (2006.01) | |
| C08G 18/02 | (2006.01) | |
| C08G 18/62 | (2006.01) | |
| C08G 18/18 | (2006.01) | |
| C09D 175/04 | (2006.01) | |
| C08G 18/78 | (2006.01) | |
| C08G 18/68 | (2006.01) | |
| C08G 18/73 | (2006.01) | |

(52) U.S. Cl.
CPC ......... *C08G 18/161* (2013.01); *C08G 18/168* (2013.01); *C08G 18/1875* (2013.01); *C08G 18/6216* (2013.01); *C08G 18/68* (2013.01); *C08G 18/721* (2013.01); *C08G 18/722* (2013.01); *C08G 18/725* (2013.01); *C08G 18/73* (2013.01); *C08G 18/7831* (2013.01); *C08G 18/8019* (2013.01); *C08G 18/8029* (2013.01); *C09D 175/04* (2013.01)

(56) References Cited

U.S. PATENT DOCUMENTS

| | | | |
|---|---|---|---|
| 5,086,175 | A | 2/1992 | Minato et al. |
| 5,354,834 | A | 10/1994 | Yoshida |
| 5,478,897 | A | 12/1995 | Teruo |
| 6,569,533 | B1 | 5/2003 | Uchida |
| 10,081,703 | B2 | 9/2018 | Tsukada |
| 2002/0157789 | A1 | 10/2002 | Imai et al. |
| 2003/0109664 | A1 | 6/2003 | Adams et al. |
| 2003/0207122 | A1 | 11/2003 | Uchida et al. |
| 2003/0229194 | A1 | 12/2003 | Nomura et al. |
| 2007/0009817 | A1 | 1/2007 | Kim |
| 2009/0131603 | A1 | 5/2009 | Yoshiyuki |
| 2010/0216905 | A1 | 8/2010 | Kuwamura et al. |
| 2010/0305294 | A1 | 12/2010 | Kanayama et al. |
| 2011/0034660 | A1 | 2/2011 | Ryu et al. |
| 2011/0076621 | A1 | 3/2011 | Shimono et al. |
| 2013/0116357 | A1* | 5/2013 | Laas ................. C08G 18/3876 521/172 |
| 2013/0158145 | A1 | 6/2013 | Laas et al. |
| 2013/0158146 | A1 | 6/2013 | Greszta-Franz et al. |
| 2013/0338330 | A1 | 12/2013 | Nakagawa et al. |
| 2015/0158966 | A1 | 6/2015 | Laas et al. |
| 2017/0009002 | A1 | 1/2017 | Shinsuke |
| 2018/0162986 | A1 | 6/2018 | Nakagawa |
| 2018/0171065 | A1 | 6/2018 | Nakagawa et al. |
| 2018/0179317 | A1 | 6/2018 | Nakagawa |

FOREIGN PATENT DOCUMENTS

| | | | |
|---|---|---|---|
| CN | 1871272 A | 11/2006 | |
| CN | 101608013 A | 12/2009 | |
| CN | 101821309 | 9/2010 | |
| CN | 103347852 | 10/2013 | |
| CN | 104693414 | 6/2015 | |
| EP | 3194362 A1 | 7/2017 | |
| EP | 3194363 A1 | 7/2017 | |
| JP | S49-110684 A | 10/1974 | |
| JP | S50-030843 A | 3/1975 | |
| JP | S53-52598 A | 5/1978 | |
| JP | S54-138586 A | 10/1979 | |
| JP | S63-027347 B2 | 6/1988 | |
| JP | S63-145273 A | 6/1988 | |
| JP | S64043572 A | 2/1989 | |
| JP | H01311117 A | 12/1989 | |
| JP | H04001278 A | 1/1992 | |
| JP | H05117585 A | 5/1993 | |
| JP | H06-336573 A | 12/1994 | |
| JP | 07011225 | 1/1995 | |
| JP | H09183826 A | 7/1997 | |
| JP | H10039102 A | 2/1998 | |
| JP | H10-319202 A | 12/1998 | |
| JP | H10-319203 A | 12/1998 | |
| JP | H11-171966 A | 6/1999 | |
| JP | 3055197 | 6/2000 | |
| JP | 2001098047 A2 | 4/2001 | |
| JP | 2002-020452 A | 1/2002 | |
| JP | 2002249745 A | 9/2002 | |
| JP | 2004143275 A | 5/2004 | |
| JP | 2008-111072 A | 5/2008 | |
| JP | 2010-024386 A | 2/2010 | |
| JP | 2010024386 A * | 2/2010 | |
| JP | 2010-121011 | 6/2010 | |
| JP | 2010-254764 A | 11/2010 | |
| JP | 2010254764 A2 | 11/2010 | |
| JP | 4672102 B2 | 4/2011 | |
| JP | 2011-093314 A | 5/2011 | |
| JP | 2011208028 | 10/2011 | |
| JP | 2013-060542 A | 4/2013 | |
| JP | 2013060542 A2 | 4/2013 | |
| JP | 5253053 B2 | 7/2013 | |
| JP | 2013-531123 A | 8/2013 | |
| JP | 2013-532738 A | 8/2013 | |
| JP | 2013-534214 A | 9/2013 | |
| JP | 2014/58685 * | 3/2014 | ............ C08G 18/76 |
| JP | 2014-058685 | 4/2014 | |
| JP | 2014-084342 A | 5/2014 | |
| JP | 2015-101625 A | 6/2015 | |
| KR | 101822776 B1 | 1/2018 | |
| WO | 2007046470 A1 | 4/2007 | |
| WO | 2009/069433 A1 | 6/2009 | |
| WO | 2011/016229 A1 | 2/2011 | |
| WO | 2012121291 A1 | 9/2012 | |
| WO | 2015119220 A1 | 8/2015 | |
| WO | 2016/042124 A1 | 3/2016 | |
| WO | 2016/042125 A1 | 3/2016 | |
| WO | 2016199792 A1 | 12/2016 | |
| WO | 2016199794 A1 | 12/2016 | |
| WO | 2016199795 | 12/2016 | |

OTHER PUBLICATIONS

JP-2014/58685 Mar. 2014 English.*
International Search Report from PCT/JP2016/066994 dated Aug. 16, 2016, 4 pages.
International Search Report from PCT/JP2016/066996 dated Aug. 16, 2016, 4 pages.
International Search Report from PCT/JP2016/066997 dated Aug. 16, 2016, 4 pages.
Extended European Search Report dated Jan. 2, 2019 issued in European patent application No. 16807500.0.
Extended European Search Report dated Jan. 2, 2019 issued in European patent application No. 16807501.8.
International Preliminary Report on Patentability dated Dec. 21, 2017 filed in PCT/JP2016/066994, total 12 pages.
International Preliminary Report on Patentability dated Dec. 21, 2017 filed in PCT/JP2016/066995, total 11 pages.
International Preliminary Report on Patentability dated Dec. 21, 2017 filed in PCT/JP2016/066996, total 9 pages.
International Preliminary Report on Patentability dated Dec. 21, 2017 filed in PCT/JP2016/066997, total 12 pages.
International Search Report from PCT/JP2016/066995 dated Jul. 5, 2016, 4 pages.

* cited by examiner

US 10,793,666 B2

POLYISOCYANATE COMPOSITION, POLYURETHANE RESIN AND TWO-COMPONENT CURABLE POLYURETHANE COMPOSITION

TECHNICAL FIELD

The present invention relates to a polyisocyanate composition, a polyurethane resin, and a two-component curable polyurethane composition. In particular, the present invention relates to a polyisocyanate composition, a polyurethane resin obtained from the polyisocyanate composition, and a two-component curable polyurethane composition including a polyisocyanate component including the polyisocyanate composition.

BACKGROUND ART

A polyurethane resin is usually produced by reaction of polyisocyanate with an active hydrogen group-containing compound, and is, for example, widely used in various industrial fields such as paint, adhesives, and elastomers.

As the polyisocyanate used in the production of the polyurethane resin, for example, xylylene diisocyanate and a derivative thereof, and hexamethylene diisocyanate and a derivative thereof are known. It is also known to use a mixture of them.

The polyisocyanate is, for example, used as curing agents for coatings and adhesives. To be specific, for example, a curing agent containing a polyol modified product of xylylene diisocyanate of 30 to 90 wt %, and a biuret modified product and/or a trimer of hexamethylene diisocyanate of 10 to 70 wt % is proposed (ref: for example, Patent Document 1).

According to the curing agent, a two-component curable polyurethane composition having excellent adhesion properties, acid resistance/alkali resistance, solvent resistance, stain resistance, and weatherability can be obtained.

CITATION LIST

Patent Document

Patent Document 1: Japanese Unexamined Patent Publication No. 2010-24386

SUMMARY OF THE INVENTION

Problem to be Solved by the Invention

Meanwhile, in the field of the polyurethane resin, further improvement of optical characteristics (transmittance, haze, etc.), quick-drying properties, quick-curing properties, weatherability (light resistance), and mechanical properties (impact resistance, etc.) may be demanded in accordance with its usages.

An object of the present invention is to provide a polyisocyanate composition with which a polyurethane resin having excellent optical characteristics, quick-drying properties, quick-curing properties, weatherability (light resistance), and mechanical properties can be produced, a polyurethane resin obtained from the polyisocyanate composition, and a two-component curable polyurethane composition including a polyisocyanate component including the polyisocyanate composition.

Means for Solving the Problem

The present invention [1] includes a polyisocyanate composition containing isocyanurate derivative of xylylene diisocyanate and biuret derivative of aliphatic polyisocyanate.

The present invention [2] includes the polyisocyanate composition of the above-described [1], wherein relative to 100 parts by mass of a total amount of the polyisocyanate composition, 5 to 95 parts by mass of the isocyanurate derivative of xylylene diisocyanate is contained, and 95 to 5 parts by mass of the biuret derivative of aliphatic polyisocyanate is contained.

The present invention [3] includes the polyisocyanate composition of the above-described [1] or [2], wherein the isocyanurate derivative of xylylene diisocyanate is an isocyanurate derivative of xylylene diisocyanate that is essentially not modified with alcohols.

The present invention [4] includes the polyisocyanate composition of any one of the above-described [1] to [3], wherein in a chromatogram of the isocyanurate derivative of xylylene diisocyanate in gel permeation chromatograph measurement, the ratio of the peak area having a peak top between polystyrene-based molecular weight of 400 to 1000 relative to a total peak area is 40% or more and 70% or less.

The present invention [5] includes a polyurethane resin obtained from reaction of the polyisocyanate composition described in any one of the above-described [1] to [4] with an active hydrogen group-containing compound.

The present invention [6] includes a two-component curable polyurethane composition containing a polyisocyanate component containing the polyisocyanate composition described in any one of the above-described [1] to [4], and a polyol component.

Effects of the Invention

The polyisocyanate composition of the present invention allows for production of a polyurethane resin having excellent optical characteristics, quick-drying properties, quick-curing properties, weatherability (light resistance), and mechanical properties.

The polyurethane resin and two-component curable polyurethane composition of the present invention have excellent optical characteristics, quick-drying properties, quick-curing properties, weatherability (light resistance), and mechanical properties.

DESCRIPTION OF EMBODIMENTS

Figure 1:
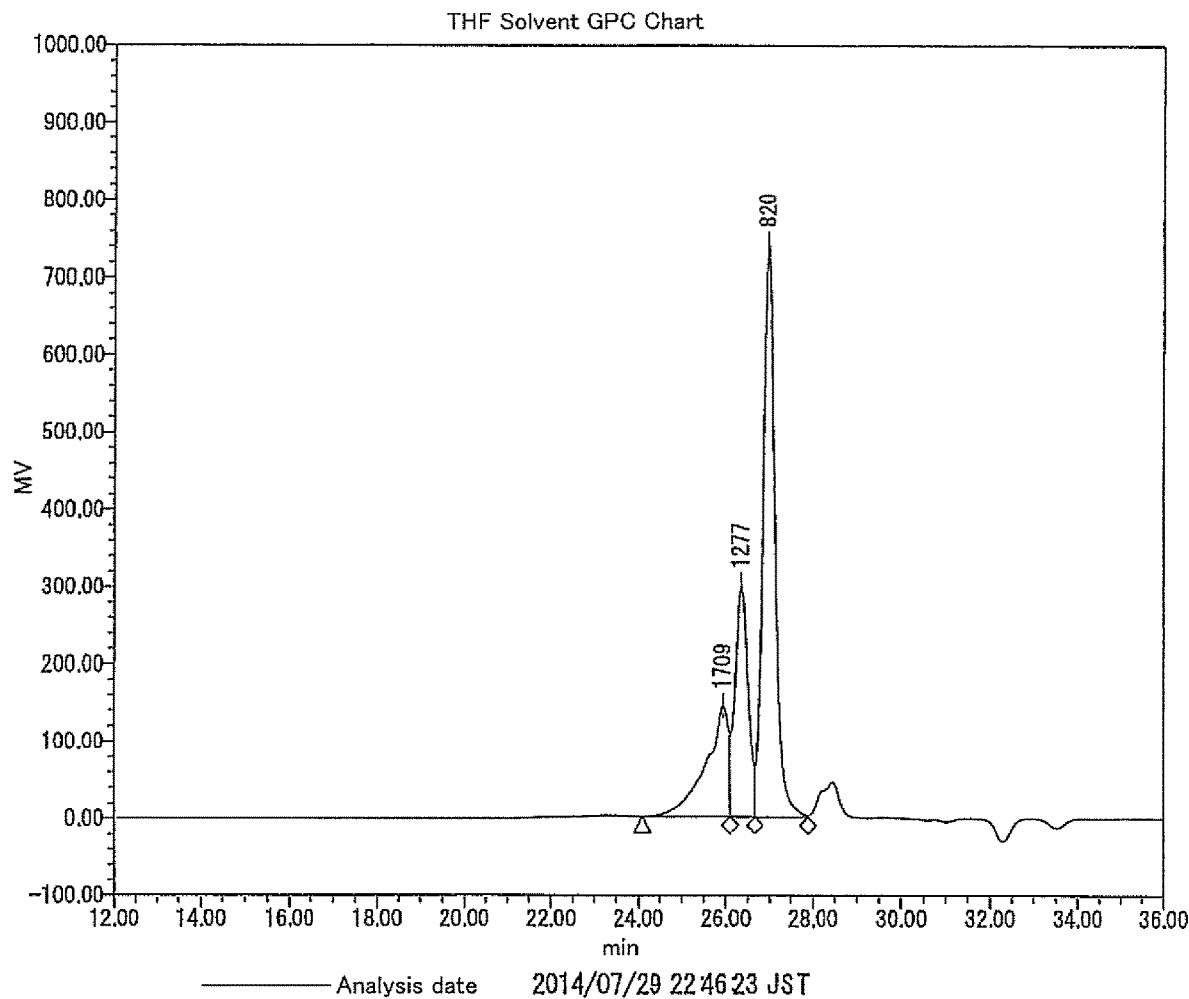
FIG. 1 is a gel permeation chromatogram of the isocyanurate derivative of xylylene diisocyanate of Production Example 4.

The polyisocyanate composition of the present invention contains an isocyanurate derivative of xylylene diisocyanate and a biuret derivative of aliphatic polyisocyanate.

The isocyanurate derivative of xylylene diisocyanate is a xylylene diisocyanate trimer, and is produced by subjecting xylylene diisocyanate to isocyanurate-formation reaction in the presence of an isocyanurate-formation catalyst.

Examples of xylylene diisocyanate include structural isomers of 1,2-xylylene diisocyanate (o-xylylene diisocyanate (o-XDI)), 1,3-xylylene diisocyanate (m-xylylene diisocyanate (m-XDI)), and 1,4-xylylene diisocyanate (p-xylylene diisocyanate (p-XDI)).

These xylylene diisocyanates may be used singly or in a combination of two or more. As the xylylene diisocyanate, preferably, 1,3-xylylene diisocyanate and 1,4-xylylene diisocyanate are used, more preferably, 1,3-xylylene diisocyanate is used.

In the present invention, the isocyanurate-formation catalyst is not particularly limited as long as the catalyst activates the isocyanurate-formation reaction. Examples thereof include tertiary amines such as triethylamine, tributylamine, triethylenediamine, and secondary amine copolymer (for example, a polycondensate of secondary amine such as dialkylamine and a monomer copolymerizable with the secondary amine (for example, phenol, formaldehyde, or the like)); Mannich bases such as 2-dimethylaminomethylphenol and 2,4,6-tris(dimethylaminomethyl) phenol; hydroxides and organic weak acid salts thereof of tetraalkylammonium such as tetramethylammonium, tetraethylammonium, tetrabutylammonium, trimethylbenzylammonium, and tributylbenzylammonium; hydroxides and organic weak acid salts thereof of trialkylhydroxyalkylammonium such as trimethylhydroxypropylammonium (also known as: N-(2-hydroxypropyl)-N,N,N-trimethylammonium), trimethylhydroxyethylammonium, triethylhydroxypropylammonium, and triethylhydroxyethylammonium; metal salts (for example, alkali metal salt, magnesium salt, tin salt, zinc salt, lead salt, or the like) of alkylcarboxylic acid such as acetic acid, caproic acid, octylic acid, myristic acid, and naphthenic acid; metal chelate compounds of β-diketone such as aluminumacetylacetone and lithiumacetylacetone; Friedel-Crafts catalysts such as aluminum chloride and boron trifluoride; various organic metal compounds such as titaniumtetrabutyrate and tributylantimonyoxide; aminosilyl group-containing compounds such as hexamethylsilazane; and halogen-substituted organic phosphorus compounds such as hydrogen difluoride tetrabutylphosphonium.

These isocyanurate-formation catalysts may be used singly or in a combination of two or more.

As the isocyanurate-formation catalyst, preferably, hydroxides of tetraalkylammonium and hydroxides of trialkylhydroxyalkylammonium are used, more preferably, hydroxides of tetraalkylammonium are used, further more preferably, hydroxides of trimethylbenzylammonium and hydroxides of tetrabutylammonium are used.

When the above-described catalyst is used as the isocyanurate-formation catalyst, the xylylene diisocyanate can be subjected to isocyanurate-formation reaction at a particularly excellent reaction rate, thereby achieving excellent production efficiency.

The isocyanurate-formation catalyst having a solid content of 100% may be used, or the isocyanurate-formation catalyst may be diluted in an organic solvent such as alcohol (for example, methanol, isopropyl alcohol, isobutyl alcohol, or the like) at an appropriate ratio.

The isocyanurate-formation catalyst (solid content) is blended in an amount relative to 100 parts by mass of xylylene diisocyanates of, for example, 0.001 parts by mass (phr) or more, preferably 0.005 parts by mass (phr) or more, more preferably 0.01 parts by mass (phr) or more, further preferably 0.012 parts by mass (phr) or more, particularly preferably 0.015 parts by mass (phr) or more, and for example, 0.1 parts by mass (phr) or less, preferably 0.06 parts by mass (phr) or less, more preferably 0.05 parts by mass (phr) or less, further preferably 0.03 parts by mass (phr) or less, particularly preferably 0.025 parts by mass (phr) or less.

In the method, the isocyanurate-formation catalyst is blended into the xylylene diisocyanate at the above-described blending ratio to be then heated, so that it is subjected to the isocyanurate-formation reaction.

The reaction conditions of the isocyanurate-formation reaction are as follows: under an atmosphere of inactive gas such as nitrogen gas and normal pressure (atmospheric pressure), the reaction temperature (maximum temperature reached) of, for example, 40° C. or more, preferably 60° C. or more, more preferably 65° C. or more, further preferably 70° C. or more, for example, 90° C. or less, preferably 80° C. or less, more preferably 77° C. or less, further preferably 75° C. or less. The reaction time is, for example, 30 minutes or more, preferably 60 minutes or more, further preferably 120 minutes or more, and further preferably 300 minutes or more, and for example, 720 minutes or less, preferably 600 minutes or less, further preferably 480 minutes or less.

In the above-described reaction, for example, an organic phosphite or the like described in Japanese Unexamined Patent Publication No. S61-129173 can be also blended as an auxiliary catalyst in order to adjust the isocyanurate-formation reaction.

Examples of the organic phosphite include an aliphatic organic phosphite and an aromatic organic phosphite.

Examples of the aliphatic organic phosphite include alkyl monophosphites such as triethyl phosphite, tributyl phosphite, tris(2-ethylhexyl) phosphite, tridecyl phosphite, trilaurvl phosphite, tris(tridecyl) phosphite, and tristearyl phosphite; di-, tri-, or tetra-phosphites derived from aliphatic polyhydric alcohol such as distearyl.pentaerythrityl.diphosphite, didodecyl.pentaerythritol.diphosphite, ditridecyl.pentaerythritol.diphosphite, and tripentaerythritol.triphosphite; furthermore, alicyclic polyphosphites such as hydrogenated bisphenol A phosphite polymer (molecular weight of 2400 to 3000); and tris(2,3-dichloropropyl) phosphites.

Examples of the aromatic organic phosphite include aryl monophosphites such as triphenylphosphite, tris(nonylphenyl) phosphite, tris(2,4-di-t-butylphenyl) phosphite, diphenyldecylphosphite, and diphenyl(tridecyl) phosphite; di-, tri-, or tetra-phosphites derived from aromatic polyhydric alcohol such as dinonylpheyl.pentaerythritol.diphosphate, tetraphenyl.tetratridecyl.pentaerythrityl.tetraphosphite, and tetraphenyl.dipropyleneglycol.diphosphite; and furthermore, diphosphites derived from bisphenol compounds such as dialkyl.bisphenol A.diphosphite having 1 to 20 carbon atoms and 4,4'-butylidene-bis(3-methyl-6-t-butylphenyl-ditridecyl) phosphite.

These organic phosphites may be used singly or in a combination of two or more.

As the organic phosphite, preferably, an aromatic organic phosphite is used, more preferably, a di-, tri-, or tetra-phosphite derived from aromatic polyhydric alcohol is used, further more preferably, tetraphenyl.dipropyleneglycol.diphosphite is used.

The organic phosphite is blended in an amount relative to 100 parts by mass of xylylene diisocyanates of, for example, 0.01 parts by mass (phr) or more, preferably 0.03 parts by mass (phr) or more, for example, 0.1 parts by mass (phr) or less, preferably 0.07 parts by mass (phr) or less.

By blending the above-described organic phosphite as an auxiliary catalyst, improvement of the reaction speed and the reaction rate can be achieved, and the gelation can be suppressed.

In the above-described reaction, a stabilizer such as hindered phenol antioxidant including 2,6-di(tert-butyl)-4-methylphenol (also known as: dibutylhydroxytoluene, hereinafter, may be abbreviated as BHT), and IRGANOX 1010, IRGANOX 1076, IRGANOX 1135, and IRGANOX 245 (hereinabove, manufactured by Ciba Japan KK, trade name) can be also added.

The blending ratio of the stabilizer with respect to 100 parts by mass of the xylylene diisocyanate is, for example, 0.01 parts by mass (phr) or more, preferably 0.02 parts by mass (phr) or more, and for example, 0.05 parts by mass (phr) or less, preferably 0.03 parts by mass (phr) or less.

In the above-described reaction, a known reaction solvent may be blended as needed, and furthermore, a known catalyst deactivator (for example, phosphoric acid, monochloroacetic acid, dodecylbenzenesulfonic acid, paratoluenesulfonic acid, benzoyl chloride, or the like) can be also added at an arbitrary timing.

After the completion of the reaction, the unreacted xylylene diisocyanate can be removed by a known method as needed.

To be specific, after the completion of the above-described isocyanurate-formation reaction, the unreacted xylylene diisocyanate monomer can be removed from the obtained reaction mixture of the isocyanurate composition composed of isocyanurate derivative of the xylylene diisocyanate and the xylylene diisocyanate monomer by, for example, a known method such as distillation such as thin-film distillation (Smith distillation) and extraction.

In the present invention, when the thin-film distillation is performed after the completion of the isocyanurate-formation reaction of the xylylene diisocyanate, the yield (distillation yield) of the isocyanurate derivative obtained by the thin-film distillation is the mass of the isocyanurate derivative of the xylylene diisocyanate with respect to the mass of the reaction mixture, and is, for example, 15 mass % or more, preferably 25 mass % or more, more preferably 40 mass % or more, for example, 70 mass % or less, preferably 64 mass % or less, more preferably 60 mass % or less.

The distillation yield of the isocyanurate derivative of the xylylene diisocyanate can be obtained in conformity with Examples to be described later by calculating the ratio of the mass of the isocyanurate derivative of the xylylene diisocyanate with respect to the mass of the reaction mixture.

In the above-described reaction, alcohols can be also blended as needed. That is, the isocyanurate modified product can be modified with alcohols.

Examples of the alcohols include aliphatic alcohols and aromatic alcohols. Preferably, aliphatic alcohols are used.

Examples of the aliphatic alcohols include monohydric aliphatic alcohols, dihydric aliphatic alcohols, trihydric aliphatic alcohols, and tetrahydric or more aliphatic alcohols.

Examples of the monohydric aliphatic alcohols include straight-chain monohydric aliphatic alcohols and branched monohydric aliphatic alcohols.

Examples of the straight-chain monohydric aliphatic alcohols include methanol, ethanol, n-propanol, n-butanol, n-pentanol, n-hexanol, n-heptanol, n-octanol, n-nonanol, n-decanol, n-undecanol, n-dodecanol (lauryl alcohol), n-tridecanol, n-tetradecanol, n-pentadecanol, n-hexadecanol, n-heptadecanol, n-octadecanol (stearyl alcohol), n-nonadecanol, and eicosanol.

Examples of the branched monohydric aliphatic alcohols include isopropanol (also known as: isopropyl alcohol, IPA), isobutanol (also known as: isobutyl alcohol, IBA), sec-butanol, tert-butanol, isopentanol, isohexanol, isoheptanol, isooctanol, 2-ethylhexanol (also known as: 2-ethylhexyl alcohol, 2-EHA), isononanol, isodecanol, 5-ethyl-2-nonanol, trimethylhonil alcohol, 2-hexyldecanol, 3,9-diethyl-6-tridecanol, 2-isoheptylisoundecanol, 2-octyldodecanol, and another branched alkanol (C (number of carbon atoms, hereinafter, the same) 5 to 20).

Examples of the dihydric aliphatic alcohols include straight-chain dihydric aliphatic alcohols such as ethylene glycol, 1,3-propanediol (1,3-PG), 1,4-butylene glycol, 1,5-pentanediol, 1,6-hexanediol, 1,4-dihydroxy-2-butene, diethylene glycol, triethylene glycol, dipropylene glycol, and another straight-chain alkane (C7 to 20) diol; branched dihydric aliphatic alcohols such as 1,2-propanediol, 1,3-butylene glycol (also known as: 1,3-butanediol), 1,2-butylene glycol, neopentyl glycol, 3-methyl-1,5-pentanediol (MPD), 2,2,4-trimethyl-1,3-pentanediol (TMPD), 3,3-dimethylolheptane, 2,6-dimethyl-1-octene-3,8-diol, and another branched alkane (C7 to 20) diol; and alicyclic dihydric aliphatic alcohols such as 1,3- or 1,4-cyclohexanedimethanol and a mixture thereof, 1,3- or 1,4-cyclohexanediol and a mixture thereof, and hydrogenated bisphenol A.

Examples of the trihydric aliphatic alcohols include glycerin and trimethylolpropane.

Examples of the tetrahydric or more aliphatic alcohols include tetramethylolmethane, D-sorbitol, xylitol, and D-mannitol.

When the alcohols have one or more hydroxy group in its molecule, the molecular structure other than that is not particularly limited as long as excellent effect of the present invention is not inhibited, and for example, the alcohols can have an ester group, an ether group, a cyclohexane ring, and an aromatic ring in its molecule. Examples of the alcohols include an ether group-containing monohydric alcohol which is an addition polymer (random and/or block polymer of two or more alkylene oxides) of the above-described monohydric alcohol and the alkylene oxide (for example, ethylene oxide, propylene oxide, or the like), and an ester group-containing monohydric alcohol which is an addition polymer of the above-described monohydric alcohol and lactone (for example, ε-caprolactone, δ-valerolactone, or the like).

These alcohols may be used singly or in a combination of two or more.

As the alcohols, preferably, aliphatic alcohols are used, more preferably, monohydric and dihydric aliphatic alcohols are used, further more preferably, dihydric aliphatic alcohols are used.

As the aliphatic alcohols, preferably, aliphatic alcohols having 1 to 20 carbon atoms are used, more preferably, aliphatic alcohols having 2 to 20 carbon atoms are used, further more preferably, aliphatic alcohols having 2 to 8 carbon atoms are used.

As the aliphatic alcohols, preferably, branched monohydric and dihydric aliphatic alcohols are used, more preferably, branched dihydric aliphatic alcohols are used.

In the present invention, for the aliphatic alcohol, particularly preferably, 1,3-butanediol is used.

The alcohols are blended so that the average functionality is two or more in the isocyanurate derivative of the xylylene diisocyanate, and are blended in an amount relative to 100 parts by mass of xylylene diisocyanates of, for example, 0.3 parts by mass or more, preferably 1.0 part by mass or more, more preferably 1.5 parts by mass or more, and for example, 11 parts by mass or less, preferably 8.0 parts by mass or less, more preferably 7.0 parts by mass or less, further preferably 5.0 parts by mass or less.

In the reaction, the xylylene diisocyanate and the alcohols are blended so that the equivalent ratio (NCO/OH) of the isocyanate group of the xylylene diisocyanate with respect to the hydroxy group of the alcohols is, for example, 5 or more, preferably 10 or more, and generally 1000 or less.

Examples of the method for modifying the isocyanurate-modified product of the xylylene diisocyanate with the alcohols include the following methods. A method in which first, the xylylene diisocyanate is allowed to react with the alcohols; next, the isocyanurate-formation reaction is performed under the presence of the isocyanurate-formation catalyst; and thereafter, the unreacted xylylene diisocyanate is removed. A method in which first, only the xylylene diisocyanate is subjected to isocyanurate-formation reaction by the above-described method: then, the unreacted xylylene diisocyanate is removed; and thereafter, the obtained polyisocyanurate is allowed to react with the alcohols.

Preferably, first, the xylylene diisocyanate is allowed to react with the alcohols; next, the isocyanurate-formation reaction is performed under the presence of the isocyanurate-formation catalyst; and thereafter, the unreacted xylylene diisocyanate is removed.

To be specific, in this method, first, the xylylene diisocyanate is mixed with the alcohols to react.

The reaction of the xylylene diisocyanate with the alcohols is the urethane-formation reaction (including allophanate-formation reaction), and the reaction conditions are as follows: for example, under an atmosphere of inactive gas such as nitrogen gas and normal pressure (atmospheric pressure), the reaction temperature of, for example, room temperature (e.g., 25° C.) or more, preferably 40° C. or more, for example, 100° C. or less, preferably 90° C. or less. The reaction time is, for example, 0.05 hours or more, preferably 0.2 hours or more, for example, 10 hours or less, preferably 6 hours or less, more preferably 2.5 hours or less.

In the above-described urethane-formation reaction, for example, a known urethane-formation catalyst such as amines and an organic metal compound may be added as needed.

Examples of the amines include tertiary amines such as triethylamine, triethylenediamine, bis-(2-dimethylaminoethyl) ether, and N-methylmorpholine; quaternary ammonium salts such as tetraethylhydroxylammonium; and imidazoles such as imidazole and 2-ethyl-4-methylimidazole.

Examples of the organic metal compound include organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate, dibutyltin dineodecanoate, dioctyltin dimethylcaptide, dioctyltin dilaurate, and dibutyltin dichloride; organic lead compounds such as lead octanoate and lead naphthenate; organic nickel compounds such as nickel naphthenate; organic cobalt compounds such as cobalt naphthenate; organic copper compounds such as copper octenoate; and organic bismuth compounds such as bismuth octylate and bismuth neodecanoate.

Furthermore, examples of the urethane-formation catalyst include potassium salts such as potassium carbonate, potassium acetate, and potassium octylate.

These urethane-formation catalysts can be used alone or in combination of two or more.

In the method, the isocyanurate-formation catalyst is blended into the reaction liquid to be obtained at the above-described blending ratio, and the reaction product of the xylylene diisocyanate and the alcohols is subjected to isocyanurate-formation reaction. The reaction conditions in the isocyanurate-formation reaction are the same as those described above. After the completion of the reaction, the unreacted xylylene diisocyanate is removed by a known removing method such as distillation as needed.

In this manner, the isocyanurate derivative of the xylylene diisocyanate that is modified with the alcohols can be obtained.

For example, when the method in which only the xylylene diisocyanate is subjected to the isocyanurate-formation reaction; then, the unreacted xylylene diisocyanate is removed; and the obtained polyisocyanate is allowed to react with the alcohols (the latter method in the description above) is used, the isocyanurate derivative of the xylylene diisocyanate reacts with the alcohols. The reaction is the urethane-formation reaction as well, and the reaction is performed under the reaction conditions of the urethane-formation reaction described above.

In this manner, the isocyanurate derivative of the xylylene diisocyanate that is modified with the alcohols can be also produced.

When the isocyanurate derivative of the xylylene diisocyanate is modified with the alcohols, an allophanate derivative of the xylylene diisocyanate may be obtained as a by-product. In this case, the isocyanurate derivative of the xylylene diisocyanate contains the allophanate derivative of the xylylene diisocyanate as an auxiliary component inevitably contained. In other words, when the isocyanurate derivative of the xylylene diisocyanate is modified with the alcohols, an isocyanurate composition containing the isocyanurate derivative of the xylylene diisocyanate and the allophanate derivative of the xylylene diisocyanate is obtained.

In the isocyanurate derivative of the xylylene diisocyanate that is modified with the alcohols, the modification amount (alcohol modification rate of the isocyanurate derivative) of the alcohols with respect to the isocyanurate derivative is, for example, 0.5 mass % or more, preferably 1.0 mass % or more, more preferably 3.0 mass % or more, for example, 15 mass % or less, preferably 10 mass % or less, more preferably 7.0 mass % or less, further preferably 6.0 mass % or less.

The modification amount (alcohol modification rate) of the alcohols with respect to the isocyanurate derivative can be calculated by the following formula.

Alcohol Modification Rate (mass %) of Isocyanurate Derivative=(Alcohol Modification Rate (mass %) in Reaction Mixture/Distillation Yield (mass %))×100

The alcohol modification rate in the reaction mixture is the modification amount of the alcohols with respect to the xylylene diisocyanate and the isocyanurate derivative in the reaction mixture, and can be calculated as the blending ratio of the charged mass of the alcohols with respect to the charged mass of the xylylene diisocyanate.

Generally, the alcohol modification rate can be also calculated by $^1$H-NMR measurement.

For example, when aliphatic alcohol is used, in $^1$H-NMR measurement (400 MHz, solvent $CDCL_3$ (3%), scan time 128) of isocyanurate derivative, the benzene proton peak of 6.5 to 8.0 ppm is assigned as the peak of the xylylene diisocyanate, and the methyl proton peak of 0.9 to 1.4 ppm is assigned as the peak of aliphatic alcohol. Then, the ratio of their peak areas can be calculated as the molar ratio of aliphatic alcohol to xylylene diisocyanate. Then, based on the calculated molar ratio, the mass ratio of the alcohol to xylylene diisocyanates is calculated, which allows for calculation of alcohol modification rate.

For the isocyanurate derivative of xylylene diisocyanate, preferably, isocyanurate derivative of xylylene diisocyanate essentially not modified with alcohols (may be referred to as unmodified isocyanurate derivative.) is used.

In the present invention, the isocyanurate derivative of xylylene diisocyanate that is not essentially modified with the alcohols is defined as a derivative that does not intentionally contain an active hydrogen group-containing compound such as the above-described alcohols as a modifier. For example, at the time of the production of the isocyanurate derivative, it is allowed to contain a modified group (for example, urethane group, urea group, or the like) with respect to the isocyanurate derivative of xylylene diisocyanate based on the active hydrogen group-containing compound (for example, solvent of isocyanurate-formation catalyst (for example, methanol or the like), water, or the like) inevitably mixed.

The isocyanurate derivative of xylylene diisocyanate has an isocyanate group concentration (solid content 100 mass %) of, for example, 10.0 mass % or more, preferably 15.0 mass % or more, more preferably 18.0 mass % or more, for example, 25.0 mass % or less, preferably 24.0 mass % or less, more preferably 23.0 mass % or less, further preferably 21.0 mass % or less.

The concentration of the isocyanate group (solid content of 100 mass %) in the isocyanurate derivative of the xylylene diisocyanate can be obtained in conformity with Examples to be described later.

In the isocyanurate derivative of the xylylene diisocyanate, the concentration of the isocyanate monomer (concentration of the unreacted xylylene diisocyanate) is, for example, 2 mass % or less, preferably 1 mass % or less, more preferably 0.5 mass % or less.

The conversion rate (reaction rate) of the isocyanate group of xylylene diisocyanate is, for example, 5 mass % or more, preferably 10 mass % or more, more preferably 15 mass % or more, for example, 50 mass % or less, preferably 40 mass % or less, more preferably 25 mass % or less.

When the isocyanurate derivative of the xylylene diisocyanate is not essentially modified with the alcohols, the conversion rate (reaction rate) of the isocyanate group of the xylylene diisocyanate is substantially the same as the isocyanurate conversion rate.

Meanwhile, when the isocyanurate derivative of the xylylene diisocyanate is modified with the alcohols, the conversion rate (reaction rate) of the isocyanate group of xylylene diisocyanate is the total value of the urethane conversion rate with the alcohols and the isocyanurate conversion rate.

In this case, the urethane conversion rate is, for example, 1 mass % or more, preferably 3 mass % or more, more preferably 5 mass % or more, and for example, 30 mass % or less, preferably 20 mass % or less, more preferably 10 mass % or less.

The conversion rate of the isocyanate group of the xylylene diisocyanate, the urethane conversion rate, and the isocyanurate conversion rate can be obtained in conformity with Examples to be described later by calculating the decreasing rate of the concentration of the isocyanate group in the reaction liquid with respect to the concentration of the isocyanate group of the xylylene diisocyanate at the time of charging.

In the present invention, in a chromatogram of the isocyanurate derivative of xylylene diisocyanate in gel permeation chromatograph measurement, ratio of the peak area having a peak top between polystyrene-based molecular weight of 400 to 1000, preferably 600 to 900 relative to a total peak area (hereinafter referred to as trimolecular-product area ratio) is 306 or more, preferably 35% or more, more preferably 40% or more, 90% or less, preferably 80% or less, further preferably 70% or less, more preferably 65% or less.

The trimolecular-product area ratio can be calculated by, in conformity with Examples described later, measuring the molecular weight distribution of isocyanurate derivative of xylylene diisocyanate based on standard polystyrene calibration curve with gel permeationchromatograph (GPC) equipped with a refractive index detector (RID), as a ratio of the peak area in the obtained chromatogram (chart).

When the isocyanurate derivative of xylylene diisocyanate is essentially not modified with alcohols, trimolecular-product area ratio corresponds to the mononuclear isocyanurate (to be specific, a compound in which trimolecular xylylene diisocyanate forms one isocyanurate ring, that is, trimolecular-product of xylylene diisocyanate bonded through an isocyanurate ring) content.

When the isocyanurate derivative of xylylene diisocyanate is modified with alcohols, the trimolecular-product area ratio corresponds to a total amount of the mononuclear isocyanurate content and trimolecular-product of allophanate derivative of xylylene diisocyanate (to be specific, a compound in which bimolecular xylylene diisocyanates are bonded through alcohols (dihydric alcohol), and monomolecular xylylene diisocyanate is allophanate bonded to (the urethane bond of) the bonded portion, that is, trimolecular-product ofxylylene diisocyanate having an allophanate bond) content.

The biuret derivative of aliphatic polyisocyanate can be produced by allowing aliphatic polyisocyanate to react with a biuret modifier.

Examples of the aliphatic polyisocyanate include aliphatic diisocyanates such as trimethylenediisocyanate, 1,2-propylenediisocyanate, butylenediisocyanate (tetramethylenediisocyanate, 1,2-butylenediisocyanate, 2,3-butlenediisocyanate, 1,3-butylenediisocyanate), 1,5-pentamethylenediisocyanate (PDI), 1,6-hexamethylenediisocyanate (also called: hexamethylenediisocyanateXHDI), 2,4,4- or 2,2,4-trimethylhexamethylenediisocyanate, and 2,6-diisocyanatemethylcaproate.

The aliphatic polyisocyanate includes alicyclic polyisocyanate.

Examples of the alicyclic polyisocyanate include alicyclic diisocyanates such as 1,3-cyclopentanediisocyanate, 1,4-cyclohexanediisocyanate, 1,3-cyclohexanediisocyanate, 3-isocyanatomethyl-3,5,5-trimethylcyclohexyl isocyanate (also called: isophorone diisocyanate, IPDI), 4,4'-methylenebis(cyclohexyl isocyanate)($H_{12}$MDI), methyl-2,4-cyclohexanediisocyanate, methyl-2,6-cyclohexanediisocyanate, 1,3- or 1,4-bis(isocyanatomethyl) cyclohexane ($H_6$XDI) and a mixture thereof, 1,3- or 1,4-bis(isocyanatoethyl) cyclohexane and a mixture thereof, and 2,5- or 2,6-bis(isocyanatomethyl) norbornane (NBDI) and a mixture thereof.

These aliphatic polyisocyanates may be used singly or in a combination of two or more.

For the aliphatic polyisocyanate, preferably 1,5-pentamethylenediisocyanate, 1,6-hexamethylenediisocyanate, 3-isocyanatomethyl-3,5,5-trimethylcyclohexyl isocyanate, 1,3- or 1,4-bis(isocyanatomethyl) cyclohexane and a mixture thereof, 2,5- or 2,6-bis(isocyanatomethyl) norbornane and a mixture thereof, and more preferably 1,5-pentamethylenediisocyanate, and 1,6-hexamethylenediisocyanate are used, and particularly preferably 1,6-hexamethylenediisocyanate is used.

Examples of the biuret modifier include water, tertiary alcohol, and secondary amine.

Examples of the tertiary alcohol include t-butylalcohol, t-amylalcohol, 2-ethyl-2-butanol, triethyl carbinol, 1,1-dimethylbenzylalcohol, 1-methyl-1-phenylbenzylalcohol, dimethylphenyl carbinol, diphenylmethyl carbinol, triphenyl carbinol, and 3-ethyl-5,5-dimethyl 3-hexanol.

These tertiary alcohols may be used singly or in a combination of two or more.

Examples of the secondary amine include dialkyl amines such as dimethylamine, diethylamine, dipropylamine, dibutylamine, dioctadecylamine. N-methylethylamine, and N-ethylpropylamine.

These secondary amines may be used singly or in a combination of two or more.

Another example of the biuret modifier include, in addition to the above-described examples, formic acid and hydrogen sulfide.

The amount of aliphatic polyisocyanate and biuret modifier blended is set suitably in accordance with the purpose and application.

In this reaction, a solvent may be used.

The solvent is not particularly limited, and can be used by suitable selection, as long as the solvent is capable of dissolving and dispersing the aliphatic polyisocyanate and the biuret modifier, and is inactive to the aliphatic polyisocyanate and the biuret modifier.

For such a solvent, to be specific, an ethylene glycol-based solvent, a propylene glycol-based solvent, and an alkylphosphoric acid-based solvent are used.

Examples of the ethylene glycol-based solvent include ethylene glycol monomethylether acetate, ethylene glycol monoethylether acetate, ethylene glycol mono-n-propylether acetate, ethylene glycol monoisopropylether acetate, ethylene glycol mono-n-butylether acetate, ethylene glycol diacetate, ethylene glycol dimethylether, ethyleneglycol diethylether, ethylene glycol di-n-propylether, ethylene glycol diisopropylether, ethylene glycol di-n-butylether, ethylene glycol methylethylether, ethylene glycol methylisopropylether, ethylene glycol methyl-n-butylether, ethylene glycol ethyl-n-propylether, ethylene glycol ethylisopropylether, ethylene glycol ethyl-n-butylether, ethylene glycol-n-propyl-n-butylether, ethylene glycol isopropyl-n-butylether, diethylene glycol monomethylether acetate, diethylene glycol monoethylether acetate, diethylene glycol mono-n-propylether acetate, diethylene glycol monoisopropylether acetate, diethylene glycol mono-n-butylether acetate, diethylene glycol diacetate, diethylene glycol dimethylether, diethylene glycol diethylether, diethylene glycol di-n-propylether, diethylene glycol diisopropylether, diethylene glycol di-n-butylether, diethylene glycol methylethylether, diethylene glycol methylisopropylether, diethylene glycol methyl-n-propylether, diethylene glycol methyl-n-butylether, diethylene glycol ethylisopropylether, diethylene glycol ethyl-n-propylether, diethylene glycol ethyl-n-butylether, diethylene glycol-n-propyl-n-butylether, and diethylene glycol isopropyl-n-butylether, preferably, ethylene glycol monomethylether acetate, ethylene glycol monoethylether acetate, ethylene glycol diacetate, and diethylene glycol dimethylether are used.

Examples of the propylene glycol-based solvent include propylene glycol monomethylether acetate, propylene glycol monoethylether acetate, propylene glycol mono-n-propylether acetate, propylene glycol monoisopropylether acetate, propylene glycol mono-n-butylether acetate, propylene glycol diacetate, propylene glycol dimethylether, propyleneglycol diethylether, propyleneglycol di-n-propylether, propylene glycol diisopropylether, propylene glycol di-n-butylether, propylene glycol methylethylether, propylene glycol methylisopropylether, propylene glycol methyl-n-butylether, propylene glycol ethyl-n-propylether, propylene glycol ethylisopropylether, propylene glycol ethyl-n-butylether, propylene glycol-n-propyl-n-butylether, propylene glycol isopropyl-n-butylether, dipropylene glycol monomethylether acetate, dipropylene glycol monoethylether acetate, dipropylene glycol mono-n-propylether acetate, dipropylene glycol monoisopropylether acetate, dipropylene glycol mono-n-butylether acetate, dipropylene glycol diacetate, dipropylene glycol dimethylether, dipropylene glycol diethylether, dipropylene glycol di-n-propylether, dipropylene glycol diisopropylether, dipropylene glycol di-n-butylether, dipropylene glycol methylethylether, dipropylene glycol methylisopropylether, dipropylene glycol methyl-n-propylether, dipropylene glycol methyl-n-butylether, dipropylene glycol ethylisopropylether, dipropylene glycol ethyl-n-propylether, dipropylene glycol ethyl-n-butylether, dipropylene glycol-n-propyl-n-butylether, and dipropylene glycol isopropyl-n-butylether, and preferably, propylene glycol monomethylether acetate, propylene glycol monoethylether acetate, and propylene glycol diacetate, dipropylene glycol dimethylether are used.

Examples of the alkylphosphoric acid-based solvent include trimethyl phosphate, triethyl phosphate, tripropyl phosphate, and tributyl phosphate, and preferably, trimethyl phosphate and triethyl phosphate are used.

These solvents may be used singly or in a combination of two or more.

The amount of the solvent blended is not particularly limited, and is set suitably in accordance with the purpose and application.

To the solvent, as necessary, an OH acid compound such as di(2-ethylhexyl) phosphate described in Japanese Unexamined Patent Publication No. Hei 8-225511 can be added.

The reaction conditions are as follows: under normal pressure, the reaction temperature is, for example, 70° C. or more, preferably 90° C. or more, for example, 200° C. or less, preferably 180° C. or less. The reaction time is, for example, 0.5 hours or more, preferably 1 hour or more, for example, 4 hours or less, preferably 3 hours or less.

Such a reaction allows for production of biuret derivative of aliphatic polyisocyanate.

The thus produced biuret derivative of aliphatic polyisocyanate has an isocyanate group concentration (solid content-based) of, and for example, 15 mass % or more, preferably 21 mass % or more, for example, 25 mass % or less, preferably 24 mass % or less.

The thus produced biuret derivative of aliphatic polyisocyanate has an isocyanate monomer concentration (unreacted aliphatic polyisocyanate concentration) of, for example, 5 mass % or less, preferably 2 mass % or less, more preferably 1 mass % or less.

For the biuret derivative of aliphatic polyisocyanate, a commercially available product can also be used. Examples of the commercially available product include, to be specific, for example, trade name TAKENATE D-165N (biuret derivative of hexamethylenediisocyanate, isocyanate group content 23.3 mass %, solid content concentration 100 mass %, manufactured by Mitsui Chemicals, Inc.).

The polyisocyanate composition contains isocyanurate derivative of xylylene diisocyanate and biuret derivative of aliphatic polyisocyanate, and does not contain a solvent. The polyisocyanate composition preferably consists of isocyanurate derivative of xylylene diisocyanate containing no solvent and biuret derivative of aliphatic polyisocyanate containing no solvent.

Such a polyisocyanate composition can be produced by, for example, by blending and mixing isocyanurate derivative of xylylene diisocyanate and biuret derivative of aliphatic polyisocyanate by a known method.

The polyisocyanate composition contains the isocyanurate derivative of xylylene diisocyanate in an amount relative to 100 parts by mass of a total amount of the polyisocyanate composition (that is, a total amount of isocyanurate derivative of xylylene diisocyanate and biuret derivative of aliphatic polyisocyanate) of, for example, 5 parts by mass or more, preferably 10 parts by mass or more, for example, 95 parts by mass or less, preferably 75 parts by mass or less, more preferably 50 parts by mass or less. The biuret derivative of aliphatic polyisocyanate is contained in an amount relative to 100 parts by mass of a total amount of the polyisocyanate composition of, for example, 5 parts by mass or more, preferably 25 parts by mass or more, more preferably 50 parts by mass or more, and for example, 95 parts by mass or less, preferably 90 parts by mass or less.

In particular, in view of improving optical characteristics (haze), the isocyanurate derivative of xylylene diisocyanate is contained in an amount relative to 100 parts by mass of a total amount of the polyisocyanate composition of preferably 1 part by mass or more, more preferably 5 parts by mass or more, preferably 75 parts by mass or less, more preferably 50 parts by mass or less, more preferably 25 parts by mass or less. The biuret derivative of aliphatic polyisocyanate is contained in an amount relative to 100 parts by mass of a total amount of the polyisocyanate composition of preferably 25 parts by mass or more, more preferably 50 parts by mass or more, more preferably 75 parts by mass or more, preferably 99 parts by mass or less, more preferably 95 parts by mass or less.

In view of improving quick-drying properties and quick-curing properties, the isocyanurate derivative of xylylene diisocyanate is contained in an amount relative to 100 parts by mass of a total amount of the polyisocyanate composition of preferably 10 parts by mass or more, more preferably 50 parts by mass or more, more preferably 75 parts by mass or more, preferably 95 parts by mass or less. The biuret derivative of aliphatic polyisocyanate is contained in an amount relative to 100 parts by mass of a total amount of the polyisocyanate composition of preferably 5 parts by mass or more, preferably 90 parts by mass or less, more preferably 50 parts by mass or less, more preferably 25 parts by mass or less.

With the configuration of the composition of the present invention, despite the fact that xylylene diisocyanate is contained in particular, weatherability and light resistance are unexpectedly excellent.

Furthermore, a known additive can be also blended to the polyisocyanate composition at an appropriate ratio as needed. Examples thereof include storage stabilizers (o-toluenesulfonamide, p-toluenesulfonamide, or the like), plasticizers, blocking inhibitors, heat-resistant stabilizers, light-resistant stabilizers, antioxidants, release agents, catalysts, pigments, dyes, lubricants, fillers, and hydrolysis inhibitors.

The additives can be blended, for example, in isocyanurate derivative of xylylene diisocyanate, or in biuret derivative of aliphatic polyisocyanate. The additives can be also blended in their mixture (that is, polyisocyanate composition).

The polyisocyanate composition does not contain a solvent, and can be diluted with an organic solvent as needed.

Examples of the organic solvent include ketones such as acetone, methyl ethyl ketone, methyl isobutyl ketone, and cyclohexanone; nitriles such as acetonitrile; alkyl esters such as methyl acetate, ethyl acetate, butyl acetate, and isobutyl acetate: aliphatic hydrocarbons such as n-hexane, n-heptane, and octane; alicyclic hydrocarbons such as cyclohexane and methyl cyclohexane: aromatic hydrocarbons such as toluene, xylene, and ethyl benzene; glycol ether esters such as methyl cellosolve acetate, ethyl cellosolve acetate, methyl carbitol acetate, ethyl carbitol acetate, ethylene glycol ethyl ether acetate, propylene glycol methyl ether acetate, 3-methyl-3-methoxybutylacetate, and ethyl-3-ethoxypropionate; ethers such as diethyl ether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic polar solvents such as N-methyl pyrrolidone, dimethyl formamide, N,N'-dimethylacetamide, dimethyl sulfoxide, and hexamethylphosphonylamide.

Furthermore, examples of the organic solvent include non-polar solvents (non-polar organic solvents). Examples of the non-polar solvents include non-polar organic solvents having an aniline point of, for example, 10 to 70° C., preferably 12 to 65° C. with low toxic and weak solubility, including aliphatic and naphthene-type hydrocarbonic organic solvents and vegetable oils represented by terpene oil.

The non-polar organic solvent can be available as a commercially available product. Examples of the commercially available product thereof include petroleum hydrocarbon organic solvents such as HAWS (manufactured by Shell Chemicals Japan, aniline point of 15° C.), SWAZOLE 310 (manufactured by Maruzen Petrochemical Co., Ltd., aniline point of 16° C.), ESSO NAPHTHA No. 6 (manufactured by Exxon Chemical, Co., Ltd., aniline point of 43° C.), LAWS (manufactured by Shell Chemicals Japan, aniline point of 43° C.), ESSO NAPHTHA No. 5 (manufactured by Exxon Chemical, Co., Ltd., aniline point of 55° C.), and PEGASOL 3040 (manufactured by Mobil Oil Corporation, aniline point of 55° C.); and in addition, terpene oils such as methyl cyclohexane (aniline point of 40° C.), ethylcyclohexane (aniline point of 44° C.), and GUM TURPENTINE N (manufactured by YASUHARA CHEMICAL CO., LTD., aniline point of 27° C.).

The polyisocyanate composition can be mixed with these organic solvents at an arbitrary ratio.

When the polyisocyanate composition is diluted with the organic solvent, for example, the organic solvent may be blended into both or any one of the isocyanurate derivative of the xylylene diisocyanate and the biuret derivative of the aliphatic polyisocyanate in advance; may be blended at the time of blending of the isocyanurate derivative of the xylylene diisocyanate and the biuret derivative of the aliphatic polyisocyanate; and furthermore, may be separately blended into the polyisocyanate composition that is obtained after blending the isocyanurate derivative of the xylylene diisocyanate and the biuret derivative of the aliphatic polyisocyanate.

When the polyisocyanate composition is diluted with the organic solvent, the concentration of the polyisocyanate composition is, for example, 20 mass % or more, preferably 30 mass % or more, and for example, 95 mass % or less, preferably 90 mass % or less.

In this case, the viscosity at 25° C. thereof is adjusted to, for example, 10 mPa·s or more, preferably 20 mPa·s or more, and for example, 10000 mPa·s or less, preferably 5000 mPa·s or less.

The polyisocyanate composition allows for production of polyurethane resin having excellent optical characteristics, quick-drying properties, quick-curing properties, weatherability (light resistance), and mechanical properties.

Thus, the polyisocyanate composition is preferably used in the production of the polyurethane resin.

The polyurethane resin can be obtained by allowing the above-described polyisocyanate composition to react with an active hydrogen group-containing compound.

In the present invention, the active hydrogen group-containing compound is, for example, an organic compound having two or more of active hydrogen group(s) such as a hydrogen group, mercapto group, and amino group in its molecule.

Examples of the active hydrogen group-containing compound include a polyol component, polythiol component, and polyamine component, and preferably, a polyol component is used.

In the present invention, examples of the polyol component include low molecular weight polyols and high molecular weight polyols.

The low molecular weight polyol is a compound having two or more hydroxyl groups and having a number average molecular weight of below 300, preferably below 400. Examples thereof include dihydric alcohols such as ethylene glycol, propylene glycol, 1,3-propanediol, 1,4-butylene glycol, 1,3-butylene glycol, 1,2-butylene glycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerin, trimethylolpropane, and triisopropanolamine; tetrahydric alcohols such as tetramethylolmethane (pentaerythritol), and diglycerin; pentahydric alcohols such as xylitol: hexahydric alcohols such as sorbitol, mannitol, allitol, iditol, dulcitol, altritol, inositol, and dipentaerythritol; heptahydric alcohols such as perseitol; and octahydric alcohols such as sucrose.

These low molecular weight polyols can be used alone or in combination of two or more.

The high molecular weight polyol is a compound having two or more hydroxyl groups and having a number average molecular weight of 300 or more, preferably 400 or more, further more preferably 500 or more. Examples thereof include polyether polyol (for example, polyoxyalkylene polyol, polytetramethylene ether polyol, or the like), polyester polyol (for example, polyester adipate polyol, polyester phthalate polyol, lactone polyester polyol, or the like), polycarbonate polyol, polyurethane polyol (for example, polyol obtained by urethane-modifying polyether polyol, polyester polyol, and polycarbonate polyol with polyisocyanate), epoxy polyol, vegetable oil polyol, polyolefin polyol, acrylic polyol, and vinyl monomer-modified polyol.

These high molecular weight polyols can be used alone or in combination of two or more.

As the high molecular weight polyol, preferably, acrylic polyol is used.

The polyurethane resin can be, for example, produced by a polymerization method such as bulk polymerization and solution polymerization.

In the bulk polymerization, for example, the polyisocyanate composition is stirred under a nitrogen gas stream, and the active hydrogen group-containing compound is added thereto to react at a reaction temperature of 50 to 250° C., further more preferably 50 to 200° C. for 0.5 to 15 hours.

In the solution polymerization, the polyisocyanate composition and the active hydrogen group-containing compound are added to the organic solvent illustrated as the organic solvent used in the dilution of the polyisocyanate composition to react at a reaction temperature of 50 to 120° C., preferably 50 to 100° C. for 0.5 to 15 hours.

Furthermore, in the above-described polymerization reaction, for example, the above-described urethane-formation catalyst may be added as needed.

In the bulk polymerization and the solution polymerization, for example, the polyisocyanate composition and the active hydrogen group-containing compound are blended so that the equivalent ratio (NCO/active hydrogen group) of the isocyanate group in the polyisocyanate composition with respect to the active hydrogen group (hydroxyl group, mercapto group, and amino group) in the active hydrogen group-containing compound is, for example, 0.75 to 1.3, preferably 0.9 to 1.1.

When the above-described polymerization reaction is performed more industrially, the polyurethane resin can be obtained by a known method such as one shot method and prepolymer method.

In the one shot method, for example, the polyisocyanate composition and the active hydrogen group-containing compound are formulated (mixed) so that the equivalent ratio (NCO/active hydrogen group) of the isocyanate group in the polyisocyanate composition with respect to the active hydrogen group (hydroxyl group, mercapto group, and amino group) in the active hydrogen group-containing compound is, for example, 0.75 to 1.3, preferably 0.9 to 1.1 to be then subjected to curing reaction at, for example, room temperature to 250° C., preferably room temperature to 200° C. for, for example, 5 minutes to 72 hours, preferably 4 to 24 hours. The curing temperature may be fixed, or can be gradually increased or cooled.

In the prepolymer method, for example, first, the polyisocyanate composition reacts with a part (preferably, high molecular weight polyol) of the active hydrogen group-containing compound, thereby synthesizing an isocyanate group-terminated prepolymer having an isocyanate group at the end of the molecule. Next, the obtained isocyanate group-terminated prepolymer reacts with a remaining portion (preferably, low molecular weight polyol and/or polyamine component) of the active hydrogen group-containing compound to be subjected to a chain extension reaction. In the prepolymer method, the remaining portion of the active hydrogen group-containing compound can be used as a chain extension agent.

To synthesize the isocyanate group-terminated prepolymer, the polyisocyanate composition and a part of the active hydrogen group-containing compound are formulated (mixed) so that the equivalent ratio (NCO/active hydrogen group) of the isocyanate group in the polyisocyanate composition with respect to the active hydrogen group in a part of the active hydrogen group-containing compound is, for example, 1.1 to 20, preferably 1.3 to 10, further more preferably 1.3 to 6 to then react in a reaction vessel at, for example, room temperature to 150° C., preferably 50 to 120° C., for, for example, 0.5 to 18 hours, preferably 2 to 10 hours. In the reaction, the above-described urethane-formation catalyst may be added as needed, and after the completion of the reaction, the unreacted polyisocyanate composition can be removed by, for example, a known removing method such as distillation and extraction as needed.

Next, to react the obtained isocyanate group-terminated prepolymer with the remaining portion of the active hydrogen group-containing compound, the isocyanate group-terminated prepolymer and the remaining portion of the active hydrogen group-containing compound are formulated (mixed) so that the equivalent ratio (NCO/active hydrogen group) of the isocyanate group in the isocyanate group-terminated prepolymer with respect to the active hydrogen group in the remaining portion of the active hydrogen group-containing compound is, for example, 0.75 to 1.3, preferably 0.9 to 1.1 to be then subjected to curing reaction at, for example, room temperature to 250° C., preferably room temperature to 200° C. for, for example, 5 minutes to 72 hours, preferably 1 to 24 hours.

In this manner, the polyurethane resin can be obtained.

When the polyurethane resin is produced, furthermore, a known additive can be added at an appropriate ratio as needed. Examples thereof include plasticizers, blocking inhibitors, heat-resistant stabilizers, light-resistant stabilizers, antioxidants, release agents, catalysts, moreover, pigments, dyes, lubricants, fillers, and hydrolysis inhibitors. These additives may be added at the time of synthesis of each of the components, at the time of mixing and dissolution of each of the components, and furthermore, after the synthesis.

The polyurethane resin is produced by using the polyisocyanate composition of the present invention, and therefore has excellent optical characteristics, quick-drying properties, quick-curing properties, weatherability (light resistance), and mechanical properties.

Therefore, the polyurethane resin can be widely used in various fields of, for example, film coating agent, various inks, adhesives, sealing agents, various microcapsules, plastic lens, artificial and synthetic leather, RIM molded articles, slush powder, elastic molded articles (spandex), and urethane foam.

The present invention includes the two-component curable polyurethane composition.

The two-component curable polyurethane composition contains a polyisocyanate component that is prepared as a curing agent and a polyol component that is prepared as a main agent.

The polyisocyanate component (curing agent) contains the above-described polyisocyanate composition, and preferably consists of the above-described polyisocyanate composition.

The polyisocyanate component (curing agent) can contain the above-described organic solvent as needed.

When the polyisocyanate component (curing agent) contains the organic solvent, the content ratio thereof is not particularly limited, and appropriately set in accordance with its purpose and usages.

The example of the polyol component (main agent) includes the above-described examples of polyol component. These polyol components can be used alone or in combination of two or more. As the polyol component, preferably, high molecular weight polyol is used, more preferably, acrylic polyol is used.

The polyol component (main agent) can contain the above-described organic solvent as needed.

When the polyol component (main agent) contains the organic solvent, the content ratio thereof is not particularly limited, and appropriately set in accordance with its purpose and usages.

In the two-component curable polyurethane composition, the polyisocyanate component (curing agent) and the polyol component (main agent) are separately prepared, and used by being blended and mixed at the time of its use.

The blending ratio of the polyisocyanate component (curing agent) and the polyol component (main agent) is adjusted so that the equivalent ratio (OH/NCO) of the hydroxyl group in the polyol component (main agent) with respect to the isocyanate group in the polyisocyanate component (curing agent) is, for example, 0.5 or more, preferably 0.75 or more, and for example, 2 or less, preferably 1.5 or less.

Also, for example, an additive may be blended into any one or both of the polyisocyanate component (curing agent) and the polyol component (main agent) as needed. Examples of the additive include epoxy resin, catalysts, coating improvers, leveling agents, defoaming agents, and stabilizers such as antioxidant and ultraviolet absorber. Examples thereof also include plasticizers, surfactants, pigments (for example, titanium oxide or the like), fillers, organic or inorganic fine particles, fungicide, and silane coupling agents. The mixing amount of the additive is appropriately determined in accordance with its purpose and usages.

The two-component curable polyurethane composition is obtained by using the polyisocyanate composition of the present invention, and therefore it has excellent optical characteristics, quick-drying properties, quick-curing properties, weatherability (light resistance), and mechanical properties.

Thus, the two-component curable polyurethane composition is preferably used in various fields such as coatings (coatings for plastic, coatings for car), adhesive material, coating material, ink, and sealant.

EXAMPLES

Next, the present invention is described based on Production Examples, Examples, and Comparative Examples. The present invention is however not limited by the following Examples. The "parts" and "%" are based on mass unless otherwise specified. The specific numerical values in blending ratio (content ratio), property value, and parameter used in the following description can be replaced with upper limit values (numerical values defined as "or less" or "below") or lower limit values (numerical values defined as "or more" or "above") of corresponding numerical values in blending ratio (content ratio), property value, and parameter described in the above-described "DESCRIPTION OF EMBODIMENTS".

The measurement methods used in Examples and Comparative Examples are described below.

<Distillation Yield of Isocyanurate Derivative>

The distillation yield of the isocyanurate derivative was obtained by measuring the mass of the reaction mixture (liquid before distillation) and that of the isocyanurate derivative (liquid after distillation), and calculating the ratio of the mass of the isocyanurate derivative with respect to the mass of the reaction mixture by the following formula.

Distillation yield of isocyanurate derivative (mass %)=(mass (g) of isocyanurate derivative/mass (g) of reaction mixture) ×100

<Modification Amount (Alcohol Modification Rate of Isocyanurate Derivative) of Alcohols with Respect to Isocyanurate Derivative>

The modification amount (alcohol modification rate in the reaction mixture) of the alcohols relative to xylylene diisocyanate and isocyanurate derivative in the reaction mixture was calculated as the charged mass of the alcohols with respect to the charged mass of the xylylene diisocyanate.

The modification amount (alcohol modification rate of the isocyanurate derivative) of the alcohols with respect to the isocyanurate derivative was calculated by the following formula.

Alcohol Modification Rate (mass %) of Isocyanurate Derivative=(Alcohol Modification Rate (mass %) in Reaction Mixture/Distillation Yield (mass %))×100

<Conversion Rate (Reaction Rate) (%)>

The concentration of the isocyanate group in the reaction liquid (reaction mixture or isocyanurate derivative) was measured in conformity with JIS K-1603-1 (2010), and by obtaining the decreasing rate thereof, the conversion rate (reaction rate) of the isocyanate group was obtained.

When the isocyanurate derivative of xylylene diisocyanate was not essentially modified with the alcohols, the conversion rate of the isocyanate group was the isocyanurate conversion rate.

When the isocyanurate derivative of the xylylene diisocyanate was modified with the alcohols, the conversion rate of the isocyanate group after addition of the alcohols and before addition of the isocyanurate-formation catalyst was the urethane conversion rate. The conversion rate of the isocyanate group after addition of the isocyanurate-formation catalyst was the isocyanurate conversion rate.

<Trimolecular-product Area Ratio>

The isocyanurate derivative sample was measured by gel permeation chromatography (GPC), and the trimolecular-product area ratio was determined based on the ratio of the peak area having a peak top between polystyrene-based molecular weight of 400 to 1000 relative to a total peak area in the obtained chromatogram (chart).

The trimolecular-product area ratio was also the ratio of the peak area having a peak top between the retention time of 26.7 minutes to 27.1 minute relative to a total peak area in the chromatogram (chart) obtained with the following device.

In the GPC measurement, a sample of about 0.04 g was taken, and the sample was subjected to methylurethane-formation reaction with methanol. Thereafter, excessive methanol was removed, and 10 mL of tetrahydrofuran was added and dissolved. The obtained solution was subjected to GPC measurement with the following conditions.
(1) Analysis device: Alliance (Waters)
(2) Pump: Alliance 2695 (Waters)
(3) Detection device: 2414 type refractive index detector (Waters)
(4) Eluent: Tetrahydrofuran
(5) Separation column: Plgel GUARD+Plgel 5 μm Mixed-C×3 (50×7.5 mm, 300×7.5 mm)
  Manufacturer: Polymer Laboratories
  Product number; PL1110-6500
(6) Measurement temperature: 40° C.
(7) Flow velocity: 1 mL/min
(8) Sample injection amount: 1001 μL
(9) Analysis device: EMPOWER data processing device (Waters)

Figure 2:
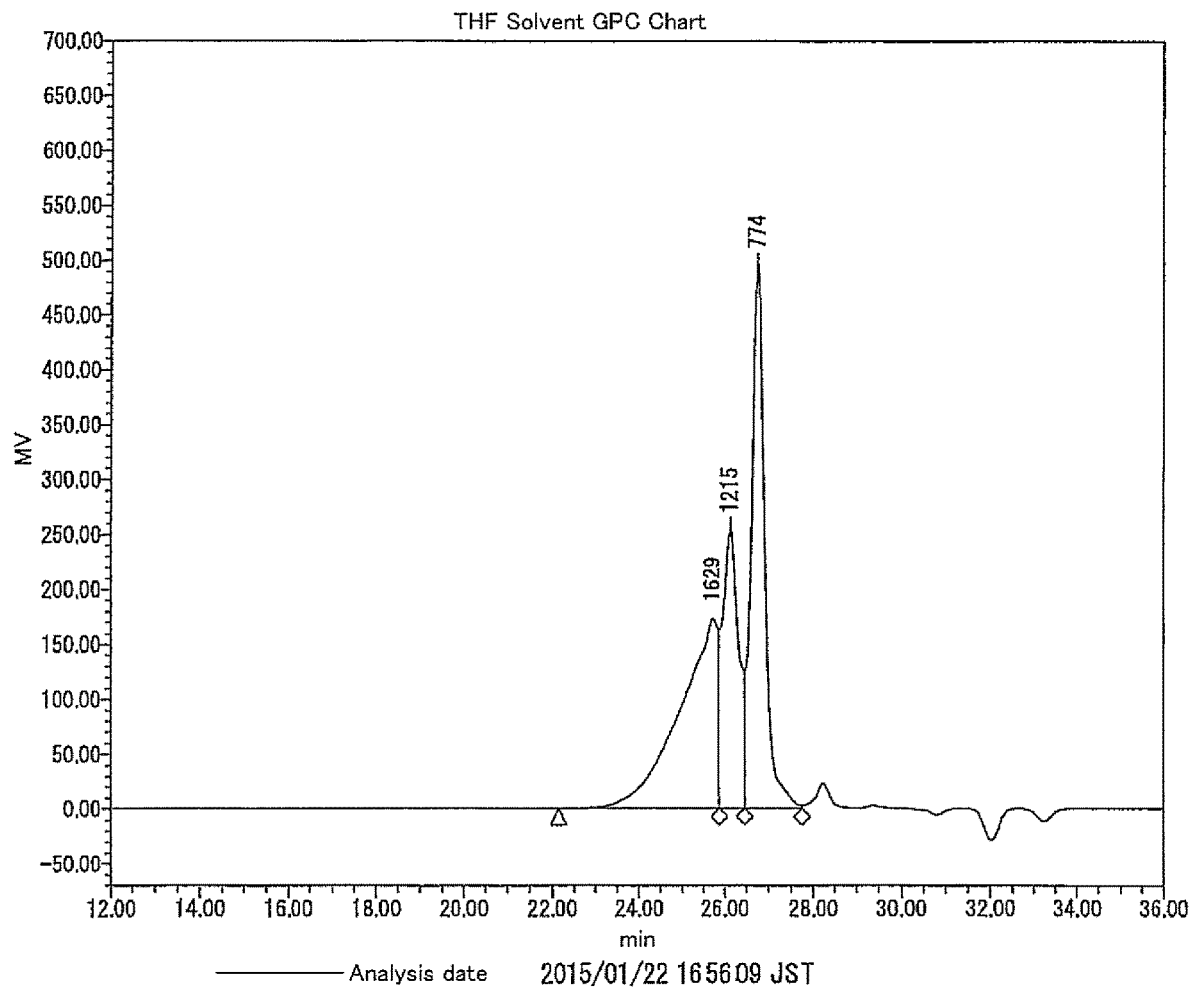
FIG. 2 is a gel permeation chromatogram of the isocyanurate derivative of xylylene diisocyanate of Production Example 9.

System correction
(1) Standard material: Polystyrene
(2) Calibration curve preparation method: using TSK standard Polystyrene having different molecular weights manufactured by TOSOH, graphs for retention time versus molecular weight were made.
(3) Injection amount, injection concentration: 100 μL, 1 mg/mL FIG. 1 shows a gel permeation chromatogram of isocyanurate derivative of xylylene diisocyanate of Production Example 4, and FIG. 2 shows a gel permeation chromatogram of isocyanurate derivative of xylylene diisocyanate of Production Example 9.

<Isocyanurate Derivative of Xylylene Diisocyanate>

Production Example 1

A reactor equipped with a thermometer, stirrer, nitrogen inlet tube, and condenser tube was charged with 100 parts by mass of 1,3-xylylene diisocyanate (manufactured by Mitsui Chemicals, Inc., m-XDI), 0.025 phr of 2,6-di (tert-butyl)-4-methylphenol (also called: dibutylhydroxytoluene. BHT, hindered phenol antioxidant (stabilizer)), and 0.05 phr of tetraphenyl.dipropylene glycol.diphosphite (JPP-100 (trade name, manufactured by Johoku Chemical Co. Ltd.) organic phosphite, auxiliary catalyst) in a nitrogen atmosphere. Thereafter, 0.04 phr (solid content-based 0.015 phr) of a solution of tetrabutylammonium hydroxide (TBAOH) (37% methanol solution) was added to the charged liquid as the isocyanurate-formation catalyst. The mixture was allowed to react at a reaction start temperature of 60° C. for 120 minutes. The maximum temperature reached during the reaction was 68° C.

The produced reaction mixture was allowed to pass through a thin-film distillation device (temperature 150° C., degree of vacuum 50 Pa) to remove unreacted xylylene diisocyanate, thereby producing isocyanurate derivative of xylylene diisocyanate. The distillation yield was 16.1 mass %.

In the reaction, the alcohol modification rate was 0 mass %, isocyanate group conversion rate (that is, isocyanurate conversion rate) was 8.6 mass %, and trimolecular-product area ratio was 85%.

Production Examples 2 to 8

Isocyanurate derivative of xylylene diisocyanate was produced in the same manner as in Production Example 1, except that formulation and production conditions shown in Table I were used.

Production Example 9

A reactor equipped with a thermometer, stirrer, nitrogen inlet tube, and condenser tube was charged with 100 parts by mass of 1,3-xylylene diisocyanate (manufactured by Mitsui Chemicals, Inc., m-XDI), 0.025 phr of IRGANOX 1076 (Irg 1076 (trade name, manufactured by Ciba Japan K.K.) hindered phenol antioxidant), and 0.05 phr of tridecylphosphite (JP-310 (trade name, manufactured by Johoku Chemical Co. Ltd.), aliphatic organic phosphite, auxiliary catalyst) in a nitrogen atmosphere. Thereafter, 4.00 parts by mass of 1,3-butanediol was added to the charged liquid, and the temperature of the charged liquid was increased to 75° C., thereby causing urethane-formation reaction. The equivalent ratio (NCO/OH) of the isocyanate group of 1,3-xylylene diisocyanate relative to the hydroxy group of 1,3-butanediol was 12.

Then, the reaction was performed at the same temperature for 120 minutes, and thereafter, the temperature was decreased to 60° C. Then, 0.024 phr (solid content-based 0.009 phr) of a solution (37% methanol solution) of hydroxide of tetrabutylammonium (TBAOH) was blended as the isocyanurate-formation catalyst, thereby performing isocyanurate-formation reaction. The isocyanurate-formation reaction was terminated after 290 minutes from the start of the reaction. The maximum temperature reached during the reaction was 74° C.

The produced reaction mixture was allowed to pass through a thin-film distillation device (temperature 150° C., degree of vacuum 50 Pa) to remove unreacted xylylene diisocyanate, thereby producing a polyisocyanurate composition. The distillation yield was 64.8 mass %.

In this reaction, the alcohol modification rate in the reaction mixture (before distillation) was 3.85 mass %, the alcohol modification rate in the isocyanurate derivative (after distillation) was 5.94 mass %, the isocyanate group conversion rate was 38.3 mass %, the urethane conversion rate was 8.8 mass %, the isocyanurate conversion rate was 29.5 mass %, and trimolecular-product area ratio was 38%.

TABLE 1

| | Production Example 1 | Production Example 2 | Production Example 3 | Production Example 4 | Production Example 5 | Production Example 6 | Production Example 7 | Production Example 8 |
|---|---|---|---|---|---|---|---|---|
| Alcohol (modifier) | No modification | No modification | No modification | No modification | No modification | No modification | No modification | No modification |
| Alcohol modification rate (mass %) | — | — | — | — | — | — | — | — |
| Amount of additives (phr) | | | | | | | | |
| Irg1076 | — | — | — | — | 0.025 | 0.025 | — | — |
| BHT | 0.025 | 0.025 | 0.024 | 0.025 | — | — | 0.024 | 0.024 |
| JP-310 | — | — | — | — | — | — | — | — |
| JPP-100 | 0.05 | 0.05 | 0.05 | 0.05 | 0.05 | 0.05 | 0.05 | 0.05 |
| Catalyst | | | | | | | | |
| Type | TBAOH | TBAOH | TBAOH | TBAOH | TBAOH | TBAOH | TBAOH | TBAOH |
| Amount added (phr) | 0.040 | 0.040 | 0.048 | 0.056 | 0.054 | 0.048 | 0.048 | 0.040 |
| Amount added based on solid content (phr) | 0.015 | 0.015 | 0.018 | 0.021 | 0.020 | 0.018 | 0.018 | 0.015 |
| Reaction conditions | | | | | | | | |
| Reaction start temperature (° C.) | 60 | 60 | 70 | 60 | 64 | 60 | 60 | 60 |
| Highest temperature reached (° C.) | 68 | 77 | 77 | 72 | 77 | 77 | 79 | 79 |
| Reaction time (min) | 120 | 140 | 300 | 480 | 465 | 470 | 495 | 510 |
| Isocyanate group concentration at the time of reaction start (mass %) | 44.7 | 44.7 | 44.7 | 44.7 | 44.7 | 44.7 | 44.7 | 44.7 |
| Isocyanate group concentration after completion of reaction (mass %) | 40.8 | 39.3 | 35.9 | 30.4 | 29.4 | 28.0 | 27.1 | 26.2 |
| Isocyanate group conversion rate (%) | 8.6 | 11.9 | 19.6 | 31.9 | 34.1 | 37.3 | 39.4 | 41.4 |
| Urethane conversion rate (%) | 0 | 0 | 0 | 0 | 0 | 0 | 0 | 0 |
| Isocyanurate conversion rate (%) | 8.6 | 11.9 | 19.6 | 31.9 | 34.1 | 37.3 | 39.4 | 41.4 |
| Distillation Yield (%) | 16.1 | 22.2 | 31.5 | 57.4 | 59.0 | 61.1 | 62.2 | 63.8 |
| Alcohol modification rate (mass %) | — | — | — | — | — | — | — | — |
| NCO % (solid content 100%) | 21.2 | 21.2 | 20.5 | 20.5 | 19.5 | 17.4 | 16.5 | 15.8 |
| Trimolecular-product area ratio (%) | 85 | 80 | 67 | 55 | 47 | 42 | 36 | 30 |

TABLE 2

| | No. Production Example 9 |
|---|---|
| Alcohol (modifier) | 1,3-BG |
| Alcohol modification rate (mass %) | 3.85 |
| Amount of additives (phr) | |
| Irg1076 | 0.025 |
| BHT | — |
| JP-310 | 0.05 |
| JPP-100 | — |
| Reaction conditions (Urethane-formation) | |
| R(NCO/OH) | 12 |
| Reaction temperature (° C.) | 75 |
| Reaction time (min) | 120 |
| Catalyst | |
| Type | TBAOH |
| Amount added (phr) | 0.024 |
| Amount added based on solid content (phr) | 0.009 |
| Reaction conditions (Isocyanurate-formation) | |
| Reaction start temperature (° C.) | 60 |
| Highest temperature reached (° C.) | 74 |
| Reaction time (min) | 290 |
| Isocyanate group concentration at the time of reaction start (mass %) | 42.8 |
| Isocyanate group concentration after urethane-formation reaction (mass %) | 39.0 |
| Isocyanate group concentration after isocyanurate-formation reaction (mass %) | 26.4 |
| isocyanate group conversion rate (%) | 38.3 |
| Urethane conversion rate (%) | 8.8 |
| Isocyanurate conversion rate(%) | 29.5 |
| Distillation Yield (%) | 64.8 |
| Alcohol modification rate (mass %) | 5.94 |
| NCO % (solid content 100%) | 17.3 |
| Trimolecular-product area ratio (%) | 38 |

The abbreviations used in Tables are described below.
Irg 1076: IRGANOX 1076, hindered phenol antioxidant, manufactured by Ciba Japan K.K.
BHT: 2,6-di (tert-butyl)-4-methylphenol (also called: dibutylhydroxytoluene, hindered phenol antioxidant
JP-310: tridecylphosphite, aliphatic organic phosphite, auxiliary catalyst, manufactured by Johoku Chemical Co. Ltd.
JPP-100: tetraphenyl.dipropylene glycol.diphosphite, organic phosphite, auxiliary catalyst, manufactured by Johoku Chemical Co. Ltd.
TBAOH: solution of hydroxide of tetrabutylammonium, solvent propylene glycol monomethylether acetate, concentration 9.09 mass %
1,3-BG: 1,3-butanediol Examples 1 to 21 and Comparative Examples 1 to 15

A polyisocyanate composition was produced by blending the isocyanurate derivative of xylylene diisocyanate produced in Production Example, a commercially available polyol derivative of xylylene diisocyanate, a commercially available biuret derivative of aliphatic polyisocyanate (hexamethylenediisocyanate), and a commercially available aliphatic polyisocyanate (hexamethylenediisocyanate) trimer in accordance with the combinations and formulations shown in Table 3 to Table 8.
Evaluation
(Preparation of Coating Solution)
The polyisocyanate composition produced in Examples and Comparative Examples was diluted with ethyl acetate, and a solution having a solid content of 75 mass % was prepared. Then, the produced solution of polyisocyanate composition was blended with acrylic polyol (manufactured by Mitsui Chemicals, Inc., trade name: OLESTER Q666, hereinafter noted as Q666) at a ratio so that the equivalent ratio (NCO/OH) of the hydroxyl group in the acrylic polyol relative to the isocyanate group in the polyisocyanate composition was 1.0, and the mixture was diluted with a thinner (ethyl acetate/propylene glycol monomethylether acetate/butyl acetate mixed at a weight ratio of 1:1:1) so that its solid content was 50 mass %. Thereafter, the mixture was stirred at 23° C. for 5 minutes. Furthermore, ultrasonic treatment was performed for 10 minutes to defoam, thereby producing a coating solution.
(Production of Urethane Film)
The coating solution produced as described above was applied on a steel plate (SPCC, treated with PBN-144) and on a polymethylmethacrylate (PMMA) plate so that their film thicknesses after drying were 40 μm, and on a glass plate so that its film thickness after drying was 100 μm. Then, after drying at 23° C. for 2 hours, heat treatment was performed at 80° C. for 30 minutes. Thereafter, they were aged at 23° C. and a relative humidity of 55% for 7 days, thereby producing a urethane film on the steel plate, PMMA plate, and glass plate.
The produced films were used for the physical property evaluations below.
Physical Property Evaluations
Physical properties below were evaluated using the coating solution and urethane film of Examples and Comparative Examples.
(Set-to-touch Time)
The coating solution was applied on the glass plate using an applicator so that the thickness (thickness before drying) was 100 μm. After application, under conditions of 23° C. and a relative humidity of 30%, the time until there is no tack when touched by fingers was measured.
(Through-dry Time)
The coating solution was applied on a glass plate using an applicator so that the thickness (thickness before drying) was 100 μm. After the application, under conditions of 23° C. and relative humidity of 30%, the time until there is no fingerprint marks when pressed strongly with fingers was measured.
(Compatibility Evaluation of Film Conditions)
The haze of the urethane film applied on the glass plate was evaluated with a haze meter (manufactured by Nippon Denshoku Industries Co., Ltd., NDH 2000).
(Evaluation of Weatherability)
The urethane film applied on the PMMA plate was subjected to evaluation using an accelerated weatherability tester (Dewpanel Light Control Weather Meter, manufactured by Suga Test Instruments Co., Ltd.) with a cycle of daytime (60° C.×relative humidity 10%×4 hours×light irradiation) and night time (50° C.×relative humidity 95%×4 hours×no light irradiation) for 600 hours. The urethane film before and after the treatment was evaluated with a color meter (manufactured by Nippon Denshoku Industries Co., Ltd., SE2000), and the color difference (ΔE) before and after the treatment was calculated. Furthermore, gloss was evaluated with a gloss meter (manufactured by Nippon Denshoku Industries Co., Ltd., VG2000), and the gloss retention (after 600 hours) was determined setting the initial gloss as 100.
(Evaluation of Impact Resistance (DuPont Impact))
The urethane film applied on the steel plate was sandwiched between a ½ inch impact needle and a receiving plate of a DuPont impact tester, and using a weight (300 g), an impact was given from the face (surface) where the urethane film was formed in the steel plate, and the height (cm) of the weight from which the urethane film was damaged was measured.

(Evaluation of Erichsen Test)

In conformity with JIS K 5600-5-2 (1999), a 20 mm-diameter drawing punch was allowed to contact the side opposite to the urethane film applied on the steel plate and the steel plate was firmly fixed, and the drawing punch was pressed against at a predetermined speed on the surface of the urethane film, and the length of the pressing at which cracks and peeling occurred was determined as Erichsen (mm).

Table 3 shows the evaluation results for the case when the isocyanurate derivative of xylylene diisocyanate essentially not modified with alcohols and the biuret derivative of aliphatic polyisocyanate (hexamethylenediisocyanate) were blended.

Figure 3:
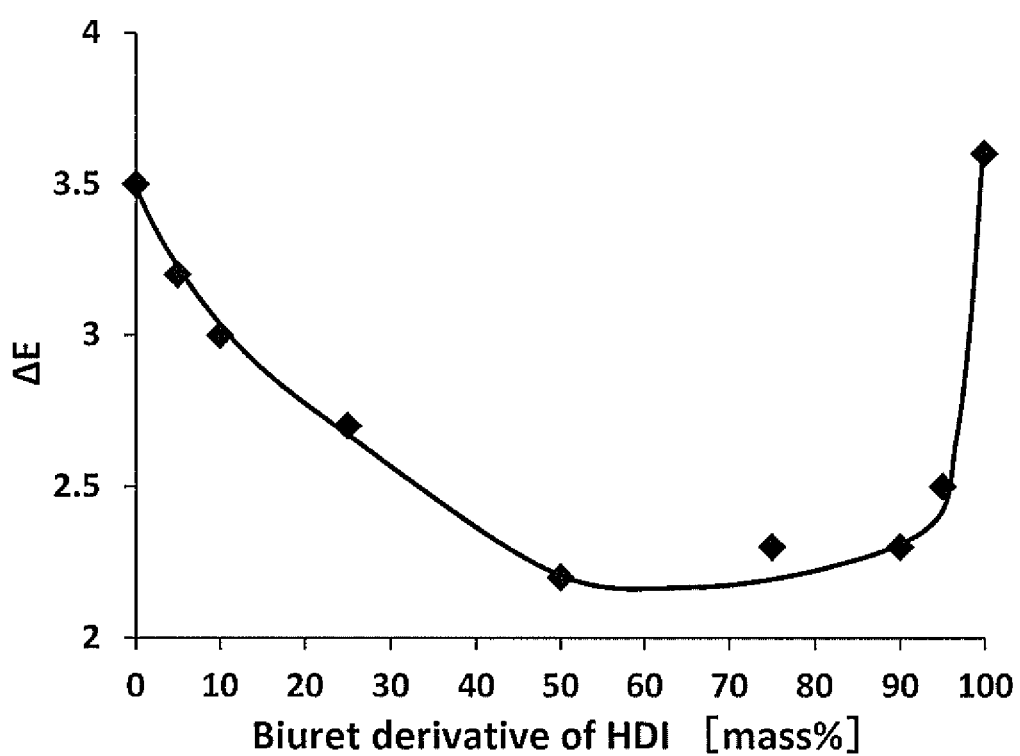
FIG. 3 is a graph illustrating the relationship between the mass ratio of biuret derivative of hexamethylenediisocyanate and ΔE.

Table 4 shows the evaluation results for the case when the isocyanurate derivative of xylylene diisocyanate modified with alcohols and the biuret derivative of aliphatic polyisocyanate (hexamethylenediisocyanate) were blended. FIG. 3 shows the relationship between the mass ratio of the biuret derivative of hexamethylenediisocyanate (HDI) and ΔE.

Table 5 and Table 6 show the evaluation results for the isocyanurate derivatives of xylylene diisocyanate essentially not modified with alcohols having different trimolecular-product area ratios.

Table 7 shows the evaluation results for the case when the polyol derivative of xylylene diisocyanate is used instead of the isocyanurate derivative of xylylene diisocyanate.

Table 8 shows the evaluation results for the case when the aliphatic polyisocyanate (hexamethylenediisocyanate) trimer is used instead of the biuret derivative of aliphatic polyisocyanate (hexamethylenediisocyanate).

TABLE 3

| | | No. | | | | | | | | |
|---|---|---|---|---|---|---|---|---|---|---|
| | | Comp. Example 2 | Ex. 1 | Ex. 2 | Ex. 3 | Ex. 4 | Ex. 5 | Ex. 6 | Ex. 7 | Comp. Ex. 1 |
| Biuret derivative of aliphatic polyisocyanate | Type | D-165N | D-165N | D-165N | D-165N | D-165N | D-165N | D-165N | D-165N | — |
| | Mass % | 100 | 95 | 90 | 75 | 50 | 25 | 10 | 5 | — |
| Isocyanurate derivative of xylylene diisocyanate | Type | — | Production Ex. 4 | Production Ex. 4 | Production Ex. 4 | Production Ex. 4 | Production Ex. 4 | Production Ex. 4 | Production Ex. 4 | Production Ex. 4 |
| | Mass % | — | 5 | 10 | 25 | 50 | 75 | 90 | 95 | 100 |
| | Trimolecular-product area ratio (%) | — | 56 | 56 | 56 | 56 | 56 | 56 | 56 | 56 |
| Haze | | 0.3 | 0.3 | 0.3 | 0.3 | 0.4 | 0.5 | 0.8 | 0.9 | 1.1 |
| Set-to-touch (sec) | | 195 | 150 | 125 | 120 | 105 | 100 | 100 | 100 | 100 |
| Through-dry (min) | | 160 | 130 | 115 | 110 | 100 | 95 | 95 | 95 | 95 |
| ΔE (after 600 hours) | | 3.6 | 2.3 | 2.1 | 2 | 1.8 | 2.6 | 2.9 | 2.9 | 3.4 |
| Gloss retention (after 600 hours) | | 97 | 98 | 99 | 99 | 99 | 98 | 93 | 92 | 90 |
| Impact resistance (½ inch × 300 g × cm) | | 50 | 50 | 50 | 50 | 50 | 50 | 45 | 40 | 30 |
| Erichsen (mm) | | 8.5 | 8.4 | 8.4 | 8.3 | 8.3 | 8.1 | 7.8 | 7.4 | 6.4 |

TABLE 4

| | | No. | | | | | | | | |
|---|---|---|---|---|---|---|---|---|---|---|
| | | Comp. Ex. 2 | Ex. 8 | Ex. 9 | Ex. 10 | Ex. 11 | Ex. 12 | Ex. 13 | Ex. 14 | Comp. Ex. 3 |
| Biuret derivative of aliphatic polyisocyanate | Type | D-165N | D-165N | D-165N | D-165N | D-165N | D-165N | D-165N | D-165N | — |
| | Mass % | 100 | 95 | 90 | 75 | 50 | 25 | 10 | 5 | — |
| Isocyanurate derivative of xylylene diisocyanate | Type | — | Production Ex. 9 | Production Ex. 9 | Production Ex. 9 | Production Ex. 9 | Production Ex. 9 | Production Ex. 9 | Production Ex. 9 | Production Ex. 9 |
| | Mass % | — | 5 | 10 | 25 | 50 | 75 | 90 | 95 | 100 |
| | modifier amount | — | 5.94 | 5.94 | 5.94 | 5.94 | 5.94 | 5.94 | 5.94 | 5.94 |
| | Trimolecular-product area ratio (%) | — | 38 | 38 | 38 | 38 | 38 | 38 | 38 | 38 |
| Haze | | 0.3 | 0.3 | 0.3 | 0.3 | 0.3 | 0.4 | 0.4 | 0.4 | 0.4 |
| Set-to-touch (sec) | | 195 | 160 | 135 | 130 | 120 | 110 | 110 | 105 | 105 |
| Through-dry (min) | | 160 | 135 | 120 | 115 | 110 | 105 | 105 | 105 | 100 |
| ΔE (after 600 hours) | | 3.6 | 2.5 | 2.3 | 2.3 | 2.2 | 2.7 | 3.0 | 3.2 | 3.5 |
| Gloss retention (after 600 hours) | | 97 | 98 | 99 | 99 | 99 | 98 | 92 | 88 | 85 |
| Impact resistance (½ inch × 300 g × cm) | | 50 | 50 | 50 | 50 | 50 | 50 | 50 | 50 | 50 |
| Erichsen (mm) | | 8.5 | 8.4 | 8.4 | 8.4 | 8.4 | 8.3 | 8.3 | 8.2 | 8.2 |

TABLE 5

|  |  | Ex. 15 | Ex. 16 | Ex. 17 | Ex. 4 | Ex. 18 | Ex. 19 | Ex. 20 | Ex. 21 |
|---|---|---|---|---|---|---|---|---|---|
| Biuret derivative of aliphatic polyisocyanate | Type | D-165N | D-165N | D-165N | D-165N | D-165N | D-165N | D-165N | D-165N |
|  | Mass % | 50 | 50 | 50 | 50 | 50 | 50 | 50 | 50 |
| Isocyanurate derivative of xylylene diisocyanate | Type | Production Ex. 1 | Production Ex. 2 | Production Ex. 3 | Production Ex. 4 | Production Ex. 5 | Production Ex. 6 | Production Ex. 7 | Production Ex. 8 |
|  | Mass % | 50 | 50 | 50 | 50 | 50 | 50 | 50 | 50 |
|  | Trimolecular-product area ratio (%) | 85 | 80 | 67 | 56 | 47 | 42 | 36 | 30 |
| Haze |  | 0.3 | 0.4 | 0.4 | 0.4 | 0.7 | 0.8 | 1.3 | 1.9 |
| Set-to-touch (sec) |  | 155 | 145 | 120 | 105 | 105 | 100 | 100 | 100 |
| Through-dry (min) |  | 130 | 130 | 110 | 100 | 95 | 90 | 90 | 90 |
| ΔE (after 600 hours) |  | 2.2 | 2.0 | 2.0 | 1.8 | 2.0 | 2.1 | 2.4 | 2.5 |
| Gloss retention (after 600 hours) |  | 98 | 99 | 99 | 99 | 99 | 99 | 99 | 99 |
| Impact resistance (½ inch × 300 g × cm) |  | 50 | 50 | 50 | 50 | 50 | 50 | 50 | 50 |
| Erichsen (mm) |  | 8.4 | 8.4 | 8.4 | 8.3 | 8.3 | 8.3 | 8.1 | 8.1 |

TABLE 6

|  |  | Comp. Ex. 6 | Comp. Ex. 7 | Comp. Ex. 8 | Comp. Ex. 1 | Comp. Ex. 9 | Comp. Ex. 10 | Comp. Ex. 11 | Comp. Ex. 12 |
|---|---|---|---|---|---|---|---|---|---|
| Biuret derivative of aliphatic polyisocyanate | Type | — | — | — | — | — | — | — | — |
|  | Mass % | — | — | — | — | — | — | — | — |
| Isocyanurate derivative of xylylene diisocyanate | Type | Production Ex. 1 | Production Ex. 2 | Production Ex. 3 | Production Ex. 4 | Production Ex. 5 | Production Ex. 6 | Production Ex. 7 | Production Ex. 8 |
|  | Mass % | 100 | 100 | 100 | 100 | 100 | 100 | 100 | 100 |
|  | Trimolecular-product area ratio (%) | 85 | 80 | 67 | 56 | 47 | 42 | 36 | 30 |
| Haze |  | 0.3 | 0.3 | 0.3 | 1.1 | 1.3 | 2.1 | 5.0 | 5.4 |
| Set-to-touch (sec) |  | 145 | 135 | 115 | 100 | 95 | 90 | 90 | 90 |
| Through-dry (min) |  | 120 | 120 | 105 | 95 | 90 | 85 | 85 | 85 |
| ΔE (after 600 hours) |  | 3.7 | 3.6 | 3.5 | 3.4 | 3.5 | 3.5 | 3.8 | 3.9 |
| Gloss retention (after 600 hours) |  | 83 | 85 | 91 | 90 | 90 | 88 | 83 | 79 |
| Impact resistance (½ inch × 300 g × cm) |  | 30 | 30 | 30 | 30 | 30 | 30 | 30 | 30 |
| Erichsen (mm) |  | 6.5 | 6.5 | 6.5 | 6.4 | 6.4 | 6.4 | 6.2 | 6.1 |

TABLE 7

|  |  | Comp. Ex. 4 | Comp. Ex. 5 | Ex. 3 | Ex. 4 | Ex. 10 | Ex. 11 |
|---|---|---|---|---|---|---|---|
| Biuret derivative of aliphatic polyisocyanate | Type | D-165N | D-165N | D-165N | D-165N | D-165N | D-165N |
|  | Mass % | 75 | 50 | 75 | 50 | 75 | 50 |
| Xylylene diisocyanate derivative | Type | D-110N | D-110N | Production Ex. 4 | Production Ex. 4 | Production Ex. 9 | Production Ex. 9 |
|  | Mass % | 25 | 50 | 25 | 50 | 25 | 50 |
| Haze |  | 0.4 | 0.4 | 0.3 | 0.4 | 0.3 | 0.3 |
| Set-to-touch (sec) |  | 145 | 135 | 120 | 105 | 130 | 120 |
| Through-dry (min) |  | 125 | 115 | 110 | 100 | 115 | 110 |
| ΔE (after 600 hours) |  | 4.1 | 4.9 | 2.0 | 1.8 | 2.3 | 2.2 |
| Gloss retention (after 600 hours) |  | 80 | 75 | 99 | 99 | 99 | 99 |
| Impact resistance (½ inch × 300 g × cm) |  | 50 | 50 | 50 | 50 | 50 | 50 |
| Erichsen (mm) |  | 8.4 | 8.4 | 8.3 | 8.3 | 8.4 | 8.4 |

TABLE 8

| | | Comp. Ex. 13 | Comp. Ex. 14 | Comp. Ex. 15 | Comp. Ex. 2 | Ex. 3 | Ex. 4 |
|---|---|---|---|---|---|---|---|
| Aliphatic polyisocyanate derivative | Type | D-170N | D-170N | D-170N | D-165N | D-165N | D-165N |
| | Mass % | 100 | 75 | 50 | 100 | 75 | 50 |
| Isocyanurate derivative of xylylene diisocyanate | Type | — | Production Ex. 4 | Production Ex. 4 | — | Production Ex. 4 | Production Ex. 4 |
| | Mass % | 0 | 25 | 50 | 0 | 25 | 50 |
| | Trimolecular-product area ratio (%) | — | 56 | 56 | — | 56 | 55 |
| Haze | | 0.3 | 0.4 | 0.4 | 0.3 | 0.3 | 0.4 |
| Set-to-touch (sec) | | 190 | 110 | 100 | 195 | 120 | 105 |
| Through-dry (min) | | 160 | 105 | 95 | 160 | 110 | 100 |
| ΔE (after 600 hours) | | 1.8 | 2.4 | 2.5 | 3.6 | 2.0 | 1.8 |
| Gloss retention (after 600 hours) | | 99 | 98 | 98 | 97 | 99 | 99 |
| Impact resistance (½ inch × 300 g × cm) | | 50 | 50 | 50 | 50 | 50 | 50 |
| Erichsen (mm) | | 8.4 | 8.3 | 8.3 | 8.5 | 8.3 | 8.3 |

The abbreviations used in Tables are described below.

D-110N: trimethylolpropane-modified xylylene diisocyanate, NCO group-content: 11.5 mass %, solid content concentration: 75 mass %, solvent: ethyl acetate, viscosity (25° C.): 500 mPa·s, manufactured by Mitsui Chemicals, Inc.

D-165N: biuret-modified hexamethylenediisocyanate, NCO group-content: 23.3 mass %, solid content concentration: 100 mass %, viscosity (25° C.): 2300 mPa·s, manufactured by Mitsui Chemicals, Inc.

D-170N: hexamethylenediisocyanate trimer, NCO group-content: 20.7 mass %, solid content concentration: 100 mass %, viscosity (25° C.): 2000 mPa·s, manufactured by Mitsui Chemicals, Inc.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The polyisocyanate composition, polyurethane resin, and two-component curable polyurethane composition of the present invention are widely used in various fields of, for example, coatings (coatings for plastic, automotive paint), adhesives, coating agents, inks, and sealants.

The invention claimed is:

1. A polyisocyanate composition comprising an isocyanurate derivative of xylylene diisocyanate, and a biuret derivative of aliphatic polyisocyanate,
   wherein in a chromatogram of the isocyanurate derivative of xylylene diisocyanate in gel permeation chromatograph measurement, the ratio of the peak area having a peak top between polystyrene-based molecular weight of 400 to 1000 relative to a total peak area is 35% or more and 80% or less, and
   wherein relative to 100 parts by mass of a total amount of the polyisocyanate composition,
   5 to 25 parts by mass of the isocyanurate derivative of xylylene diisocyanate is contained, and
   95 to 75 parts by mass of the biuret derivative of aliphatic polyisocyanate is contained.

2. The polyisocyanate composition according to claim 1, wherein the isocyanurate derivative of xylylene diisocyanate is an isocyanurate derivative of xylylene diisocyanate that is essentially not modified with alcohols.

3. The polyisocyanate composition according to claim 1, wherein in a chromatogram of the isocyanurate derivative of xylylene diisocyanate in gel permeation chromatograph measurement, the ratio of the peak area having a peak top between polystyrene-based molecular weight of 400 to 1000 relative to a total peak area is 40% or more and 70% or less.

4. A polyurethane resin obtained from reaction of the polyisocyanate composition according to claim 1 with an active hydrogen group-containing compound.

5. A two-component curable polyurethane composition comprising a polyisocyanate component containing the polyisocyanate composition according to claim 1, and a polyol component.

* * * * *